US012700262B2

(12) United States Patent
Bedri et al.

(10) Patent No.: US 12,700,262 B2
(45) Date of Patent: Aug. 4, 2026

(54) VISION-BASED HAND GESTURE CUSTOMIZATION

(71) Applicant: Apple Inc., Cupertino, CA (US)

(72) Inventors: Abdelkareem A. Bedri, Pittsburgh, PA (US); Gierad Laput, Pittsburgh, PA (US); Cori T. Park, White Plains, NY (US); Runchang Kang, Redmond, WA (US); Soroush Shahi Vernousfaderani, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 18/665,551

(22) Filed: May 15, 2024

(65) Prior Publication Data

US 2025/0078577 A1     Mar. 6, 2025

Related U.S. Application Data

(60) Provisional application No. 63/580,991, filed on Sep. 6, 2023.

(51) Int. Cl.
*G06V 40/20* (2022.01)
*G06V 10/44* (2022.01)
(Continued)

(52) U.S. Cl.
CPC .............. *G06V 40/28* (2022.01); *G06V 10/44* (2022.01); *G06V 10/764* (2022.01); *G06V 10/774* (2022.01); *G06V 10/82* (2022.01)

(58) Field of Classification Search
CPC . G06T 2207/30196; G06T 2207/10028; G06T 13/40; G06T 19/006; G06T 19/20;
(Continued)

(56) References Cited

U.S. PATENT DOCUMENTS 10,803,616 B1 * 10/2020 Twigg ..................... G06V 20/64
2023/0394884 A1 * 12/2023 Wang ..................... G10L 15/26

OTHER PUBLICATIONS

Liu, J., Gan, M., He, Y. et al. Multimodal multilevel attention for semi-supervised skeleton-based gesture recognition. Complex Intell. Syst. 11, 189, (Year: 2025).*

(Continued)

*Primary Examiner* — Alex Kok S Liew
(74) *Attorney, Agent, or Firm* — BAKERHOSTETLER

(57) ABSTRACT

The subject technology provides vision-based hand gesture customization. An apparatus receives input data having image representations of a first hand gestures corresponding to different types of gestures. For each of the first hand gestures, the apparatus extracts features from one of the image representations of the first hand gestures to produce a skeleton-based feature representation of a corresponding hand gesture. The apparatus produces a first trained machine learning model by training a neural network with a first dataset having skeleton-based feature representations associated with the first hand gestures to predict a classification for the first hand gestures. The apparatus generates a second dataset having training samples representing at least a second hand gesture customized by a user. The apparatus produces a second trained machine learning model by training the first trained machine learning model based on the second dataset to predict a classification for the second hand gesture.

20 Claims, 14 Drawing Sheets

(51) Int. Cl.
| | |
|---|---|
| *G06V 10/764* | (2022.01) |
| *G06V 10/774* | (2022.01) |
| *G06V 10/82* | (2022.01) |

(58) Field of Classification Search
CPC .................... G06T 7/246; G06T 17/20; G06T 2207/30204; G06T 2207/20084; G06T 7/73; G06T 2219/2021; G06T 2207/10016; G06T 7/50; G06T 17/00; G06T 2200/04; G06T 2207/20081; G06T 7/70; G06T 7/75; G06T 2207/30208; G06T 2207/10024; G06T 7/251; G06T 7/62; G06T 15/08; G06T 2207/20028; G06T 2210/56; G06T 7/596; G06T 7/60; G06T 7/74; G06T 13/80; G06T 2207/30008; G06T 2207/30241; G06T 7/292; G06T 19/00; G06T 2200/24; G06T 2207/30201; G06T 7/0012; G06T 7/248; G06T 11/60; G06T 2207/10012; G06T 2207/10048; G06T 2207/10081; G06T 2207/20076; G06T 2207/30004; G06T 2207/30012; G06T 2210/12; G06T 2210/41; G06T 2215/16; G06T 2219/024; G06T 7/0016; G06T 7/30; G06T 7/521; G06T 7/55; G06T 7/593; G06T 1/0007; G06T 1/20; G06T 11/80; G06T 13/00; G06T 13/205; G06T 15/04; G06T 2200/08; G06T 2207/10132; G06T 2207/20092; G06T 2207/30232; G06T 2219/2012; G06T 3/04; G06T 3/403; G06T 7/11; G06T 7/194; G06T 7/20; G06T 7/215; G06T 7/80; G06T 11/00; G06T 13/20; G06T 15/02; G06T 2207/20044; G06T 2207/30164; G06T 2207/30244; G06T 2207/30252; G06T 2210/16; G06T 3/00; G06T 7/277; G06T 7/77; G06N 3/09; G06N 3/045; G06N 20/00; G06N 3/08; G06N 3/0464; G06N 20/10; G06N 3/044; G06N 3/0442; G06N 3/092; G06N 3/088; G06N 3/02; G06N 3/043; G06N 5/01; G06N 3/006; G06N 3/084; G06N 3/0895; G06N 3/094; G06N 3/096; G06N 3/126
See application file for complete search history.

(56) References Cited

OTHER PUBLICATIONS

Fan, X.; Zou, L.; Liu, Z.; He, Y.; Zou, L.; Chi, R. CSAC-Net: Fast Adaptive sEMG Recognition through Attention Convolution Network and Model-Agnostic Meta-Learning. Sensors (Year: 2022).*

Akl, et al., "A novel accelerometer-based gesture recognition system," IEEE transactions on Signal Processing 59, 12 (2011), 6197-6205.

Alon, et al., "A Unified Framework for Gesture Recognition and Spatiotemporal Gesture Segmentation," IEEE transactions on pattern analysis and machine intelligence Sep. 2009, 18 pages.

Anthony, et al., "Analyzing user-generated youtube videos to understand touchscreen use by people with motor impairments," Proceedings of the SIGCHI conference on human factors in computing systems. 1223-1232.

Antoniou, et al., "How to train your MAML," arXiv preprint arXiv:1810.09502v3 (Mar. 2019).

Bangor, "An empirical evaluation of the system usability scale," Intl. Journal of Human-Computer Interaction 24, 6 (2008), 574-594.

Bilius, et al., "Understanding Wheelchair Users' Preferences for On-Body, In-Air, and On-Wheelchair Gestures," Proceedings of the 2023 CHI Conference on Human Factors in Computing Systems. 1-16.

Bord, et al., "Teaching On-Task Rollerblading and Ice-Skating to a Child with Autism," Behavior Analysis in Practice, 2017, vol. 10, pp. 178-182.

Brooke, "SUS: A quick and dirty usability scale," Usability Eval. Ind. 189 (Nov. 1995), 7 pages.

Canavan, et al., "Hand gesture recognition using a skeleton-based feature representation with a random regression forest," 2017 IEEE International Conference on Image Processing (ICIP). IEEE, 2364-2368.

Chakraborty, et al., "Review of constraints on vision-based gesture recognition for human-computer interaction," IET Computer Vision, 2018, vol. 12, Issue 1 pp. 3-15.

Cheok, et al., "A review of hand gesture and sign language recognition techniques," International Journal of Machine Learning and Cybernetics 10 (2019), 131-153.

Choi, et al., "A taxonomy and notation method for three-dimensional hand gestures," International Journal of Industrial Ergonomics 44, 1 (2014), 171-188. https://doi.org/10.1016/j.ergon.2013.10.011.

Côté-Allard, et al., "Deep Learning for Electromyographic Hand Gesture Signal Classification Using Transfer Learning," IEEE transactions on neural systems and rehabilitation engineering 27, 4 (2019), 760-771.

DeSmedt, et al., "Skeleton-Based Dynamic Hand Gesture Recognition," Proceedings of the IEEE Conference on Computer Vision and Pattern Recognition (CVPR) Workshops 2016.

Dong, et al., "An Elicitation Study on Gesture Preferences and Memorability Toward a Practical Hand-Gesture Vocabulary for Smart Televisions," IEEE Access, May 2015.

Doosti, "Hand Pose Estimation: A Survey," arXiv preprint arXiv:1903.01013v2 (Jun. 2019).

Escalante, et al., "Principal motion components for one-shot gesture recognition," arXiv preprint arXiv:1310.4822v1 (Oct. 2019).

Fathi, et al., "Understanding Egocentric Activities," 2011 international conference on computer vision. IEEE 2011.

Finn, et al., "Model-Agnostic Meta-Learning for Fast Adaptation of Deep Networks,". Proceedings of the 34th International Conference on Machine Learning, Aug. 2017.

Francke, et al., "Real-time Hand Gesture Detection and Recognition using Boosted Classifiers and Active Learning," Advances in Image and Video Technology: Second Pacific Rim Symposium, PSIVT 2007 Santiago, Chile, Dec. 17-19, 2007.

Gillian, et al., "The Gesture Recognition Toolkit," The Journal of Machine Learning Research 15, 1 (2014), 3483-3487.

Gong, et al., "WristWhirl: One-handed Continuous Smartwatch Input using Wrist Gestures," Proceedings of the 29th Annual Symposium on User Interface Software and Technology, Oct. 2016, 861-872.

Harrison, et al., "Skinput: Appropriating the Body as an Input Surface," Proceedings of the SIGCHI conference on human factors in computing systems, Apr. 2010, 453-462.

Hart, et al., "Development of NASA-TLX (Task Load Index): Results of Empirical and Theoretical Research," Advances in psychology. vol. 52. Elsevier, 139-183, 1988.

Hoffer, et al., "Deep metric learning using triplet network," Similarity-Based Pattern Recognition: Third International Workshop, SIMBAD 2015, Copenhagen, Denmark, Oct. 12-14, 2015. Proceedings 3. Springer, 84-92.

Hospedales, et al., "Meta-Learning in Neural Networks: A Survey," IEEE transactions on pattern analysis and machine intelligence 44, 9 (Sep. 2022), 5149-5169.

Hou, et al., "Spatial-Temporal Attention Res-TCN for Skeleton-based Dynamic Hand Gesture Recognition," Proceedings of the European conference on computer vision (ECCV) workshops, (2018).

Hu, et al., "WiGR: A Practical Wi-Fi-Based Gesture Recognition System with a Lightweight Few-Shot Network," Applied Sciences 11, 8 (2021), 3329.

Iravantchi, et al., "BeamBand: Hand Gesture Sensing with Ultrasonic Beamforming," Proceedings of the 2019 CHI Conference on Human Factors in Computing Systems. 1-10.

(56) References Cited

OTHER PUBLICATIONS

Ji, et al., "Survey of Hallucination in Natural Language Generation," arXiv:2202.03629v6 Feb. 2024.

Kapitanov, et al., "HaGRID—HAnd Gesture Recognition Image Dataset," arXiv preprint arXiv:2206.08219v2 (Jan. 2024).

Kim, et al., "Digits: Freehand 3D Interactions Anywhere Using a Wrist-Worn Gloveless Sensor," Proceedings of the 25th annual ACM symposium on User interface software and technology, Oct. 2012, 167-176.

Klatzky, "Allocentric and Egocentric Spatial Representations: Definitions, Distinctions, and Interconnections," Spatial cognition: An interdisciplinary approach to representing and processing spatial knowledge. Springer, Oct. 1998, 1-17.

Konečný, et al., "One-Shot-Learning Gesture Recognition using HOG-HOF Features," The Journal of Machine Learning Research 15, 1 (2014), 2513-2532.

Kulis, et al., "Metric Learning: A Survey," Foundations and Trends® in Machine Learning 5, 4 (2013), 287-364.

Laput, et al., "ViBand: High-Fidelity Bio-Acoustic Sensing Using Commodity Smartwatch Accelerometers," Proceedings of the 29th Annual Symposium on User Interface Software and Technology, Oct. 2016, 321-333.

Li, et al., "One-shot learning gesture recognition based on joint training of 3D ResNet and memory module," Multimedia Tools and Applications 79 (2020), 6727-6757.

Li, et al., "Real-time one-shot learning gesture recognition based on lightweight 3D Inception-ResNet with separable convolutions," Pattern Analysis and Applications 24, 3 (2021), 1173-1192.

Lien, et al., "Soli: Ubiquitous Gesture Sensing with Millimeter Wave Radar," ACM Transactions on Graphics (TOG) 35, 4 (Jul. 2016), 1-19.

Lin, et al., "Human hand gesture recognition using a convolution neural network," 2014 IEEE International Conference on Automation Science and Engineering (CASE). IEEE, Aug. 2014, 1038-1043.

Lou, et al., "Personalized gesture interactions for cyber-physical smart-home environments," Science China Information Sciences 60, 7 (2017), 1-15.

Lu, et al., "One-shot learning hand gesture recognition based on modified 3d convolutional neural networks," Machine Vision and Applications 30 (2019), 1157-1180.

Materzynska, et al., "The Jester Dataset: A Large-Scale Video Dataset of Human Gestures," Proceedings of the IEEE/CVF International Conference on Computer Vision Workshops, Oct. 2019.

Mikołajczyk, et al., "Data augmentation for improving deep learning in image classification problem," 2018 international interdisciplinary PhD workshop (IIPhDW), IEEE, May 2018, 117-122.

Mo, et al., "Gesture Knitter: A Hand Gesture Design Tool for Head-Mounted Mixed Reality Applications," Proceedings of the 2021 CHI Conference on Human Factors in Computing Systems, May 2021, 1-13.

Mohanty, et al., "Deep gesture: static hand gesture recognition using CNN," Proceedings of International Conference on Computer Vision and Image Processing: CVIP 2016, vol. 2. Springer, 449-461.

Nacenta, et al., "Memorability of pre-designed and user-defined gesture sets," Proceedings of the SIGCHI conference on human factors in computing systems. 1099-1108.

Nunez, et al., "Convolutional neural networks and long short-term memory for skeleton-based human activity and hand gesture recognition," Pattern Recognition 76 (2018), 80-94.

Oh, et al., "The challenges and potential of end-user gesture customization," Proceedings of the SIGCHI conference on human factors in computing systems. 1129-1138.

Ouyang, et al., "Bootstrapping Personal Gesture Shortcuts with the Wisdom of the Crowd and Handwriting Recognition," Proceedings of the SIGCHI Conference on Human Factors in Computing Systems, May 2012, pp. 2895-2904.

Parnami, et al., "Learning from Few Examples: A Summary of Approaches to Few-Shot Learning," arXiv preprint arXiv:2203. 04291 (Mar. 2022).

Rahimian, et al., "FS-HGR: Few-Shot Learning for Hand Gesture Recognition via Electromyography," IEEE transactions on neural systems and rehabilitation engineering 29 (2021), 1004-1015.

Rajendran, et al., "Meta-Learning Requires Meta-Augmentation," Advances in Neural Information Processing Systems 33 (2020), 5705-5715.

Rautaray, et al., "Vision based hand gesture recognition for human computer interaction: a survey," Artificial intelligence review 43 (2015), 1-54.

Song, et al., "A comprehensive survey of few-shot learning: Evolution, applications, challenges, and opportunities," arXiv:2205. 06743v2 May 2022.

Stewart, et al., "Online Few-Shot Gesture Learning on a Neuromorphic Processor," IEEE Journal on Emerging and Selected Topics in Circuits and Systems 10, 4 (Oct. 2020), 512-521.

Sun, et al., "Meta-Transfer Learning for Few-Shot Learning," Proceedings of the IEEE/CVF conference on computer vision and pattern recognition. 2019, 403-412.

Tian, et al., "Rethinking Few-shot Image Classification: A Good Embedding is All You Need?" Computer Vision—ECCV 2020: 16th European Conference, Glasgow, UK, Aug. 23-28, 2020, Proceedings, Part XIV 16. Springer, 266-282.

Torrey, et al., "Transfer Learning in Handbook of Research on Machine Learning Applications and Trends: Algorithms," Methods, and Techniques (ed. E. Olivas, J. Guerrero, M. Martinez-Sober, J. Magdalena-Benedito, & A. Serrano López) 2010, 242-264.

Vanschoren, "Meta-Learning: A Survey," arXiv preprint arXiv:1810. 03548v1 (Oct. 2018).

Wan, et al., "Explore efficient local features from RGB-D data for one-shot learning gesture recognition," IEEE transactions on pattern analysis and machine intelligence 38, 8 (2015), 1626-1639.

Wan, et al., "One-shot Learning Gesture Recognition from RGB-D Data Using Bag of Features," The Journal of Machine Learning Research 14, 1 (2013), 2549-2582.

Wan, et al., "ChaLearn Looking at People RGB-D Isolated and Continuous Datasets for Gesture Recognition," Proceedings of the IEEE conference on computer vision and pattern recognition workshops, 2016, 56-64.

Wang, et al., "Large-scale Isolated Gesture Recognition Using Convolutional Neural Networks," 2016 23rd international conference on pattern recognition (ICPR). IEEE, 7-12.

Wang, et al., "SimpleShot: Revisiting Nearest-Neighbor Classification for Few-Shot Learning," arXiv preprint arXiv: 1911.04623v2 (Nov. 2019).

Wen, et al., "Serendipity: Finger gesture recognition using an of-the-shelf smartwatch," Proceedings of the 2016 CHI conference on human factors in computing systems. 3847-3851.

Wen, et al., "Time Series Data Augmentation for Deep Learning: A Survey," arXiv preprint arXiv:2002.12478v4 (Mar. 2022).

Wobbrock, et al., "User-Defined Gestures for Surface Computing," Proceedings of the SIGCHI conference on human factors in computing systems, Apr. 2009, 1083-1092.

Wu, et al., "Deep Dynamic Neural Networks for Multimodal Gesture Segmentation and Recognition," IEEE transactions on pattern analysis and machine intelligence 38, 8 (Jan. 2016), 1583-1597.

Wu, et al., "One shot learning gesture recognition from rgbd images," 2012 IEEE Computer Society Conference on Computer Vision and Pattern Recognition Workshops. IEEE, 7-12.

Wu, et al., "Back-Hand-Pose: 3D Hand Pose Estimation for a Wrist-worn Camera via Dorsum Deformation Network," Proceedings of the 33rd Annual ACM Symposium on User Interface Software and Technology. Oct. 2020, 1147-1160.

Xia, et al., "Iteratively Designing Gesture Vocabularies: A Survey and Analysis of Best Practices in the HCI Literature," ACM Transactions on Computer-Human Interaction (TOCHI) 29, 4 (2022), 1-54.

Xu, et al., "Enabling hand gesture customization on wrist-worn devices," Proceedings of the 2022 CHI Conference on Human Factors in Computing Systems. 1-19.

Yang, et al., "Make Skeleton-based Action Recognition Model Smaller, Faster and Better," arXiv preprint arXiv:1907.09658v8 (Mar. 2020).

(56)        References Cited

OTHER PUBLICATIONS

Yasen, et al., "A systematic review on hand gesture recognition techniques, challenges and applications," Peer J Computer Science 5 (2019), e218.

Ying, "An Overview of Overfitting and its Solutions," In Journal of physics: Conference series, vol. 1168. IOP Publishing, (2019).

Zeng, et al., "User-definable dynamic hand gesture recognition based on Doppler radar and few-shot learning," IEEE Sensors Journal 21, 20 (2021), 23224-23233.

Zhang, et al., "BoMW: Bag of Manifold Words for One-Shot Learning Gesture Recognition from Kinect," IEEE Transactions on Circuits and Systems for Video Technology 28, 10 (2017), 2562-2573.v.

Zhou, et al., "Hypergraph transformer for skeleton-based action recognition," arXiv preprint arXiv:2211.09590v5 (Mar. 2023).

Zhu, et al., "Continuous gesture segmentation and recognition using 3DCNN and convolutional LSTM," IEEE Transactions on Multimedia 21, 4 (2018), 1011-1021.

Zou, et al., "A transfer learning model for gesture recognition based on the deep features extracted by Cnn," IEEE Transactions on Artificial Intelligence 2, 5 (2021), 447-458.

* cited by examiner

200

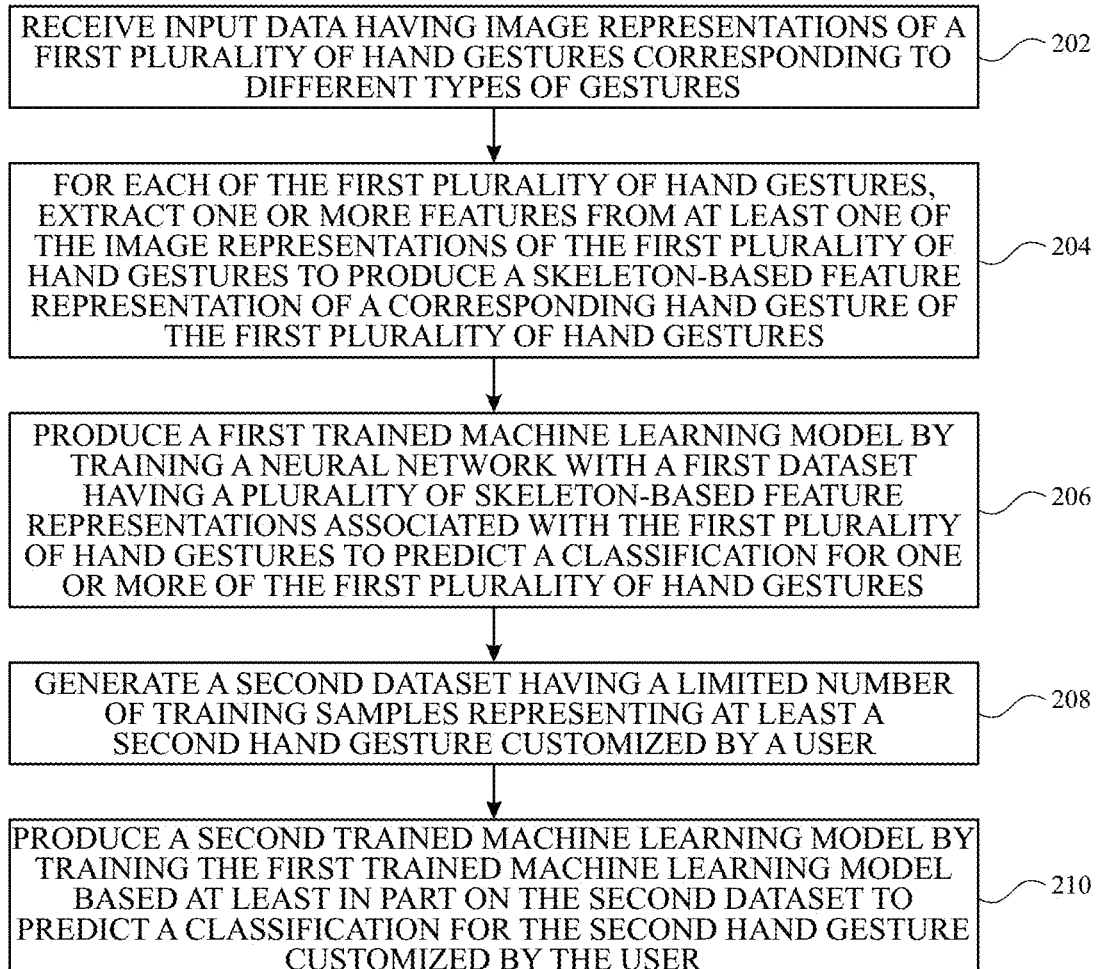

RECEIVE INPUT DATA HAVING IMAGE REPRESENTATIONS OF A FIRST PLURALITY OF HAND GESTURES CORRESPONDING TO DIFFERENT TYPES OF GESTURES ⌐202

FOR EACH OF THE FIRST PLURALITY OF HAND GESTURES, EXTRACT ONE OR MORE FEATURES FROM AT LEAST ONE OF THE IMAGE REPRESENTATIONS OF THE FIRST PLURALITY OF HAND GESTURES TO PRODUCE A SKELETON-BASED FEATURE REPRESENTATION OF A CORRESPONDING HAND GESTURE OF THE FIRST PLURALITY OF HAND GESTURES ⌐204

PRODUCE A FIRST TRAINED MACHINE LEARNING MODEL BY TRAINING A NEURAL NETWORK WITH A FIRST DATASET HAVING A PLURALITY OF SKELETON-BASED FEATURE REPRESENTATIONS ASSOCIATED WITH THE FIRST PLURALITY OF HAND GESTURES TO PREDICT A CLASSIFICATION FOR ONE OR MORE OF THE FIRST PLURALITY OF HAND GESTURES ⌐206

GENERATE A SECOND DATASET HAVING A LIMITED NUMBER OF TRAINING SAMPLES REPRESENTING AT LEAST A SECOND HAND GESTURE CUSTOMIZED BY A USER ⌐208

PRODUCE A SECOND TRAINED MACHINE LEARNING MODEL BY TRAINING THE FIRST TRAINED MACHINE LEARNING MODEL BASED AT LEAST IN PART ON THE SECOND DATASET TO PREDICT A CLASSIFICATION FOR THE SECOND HAND GESTURE CUSTOMIZED BY THE USER ⌐210

*FIG. 2*

300
310
320
INPUT    FEATURE EXTRACTION
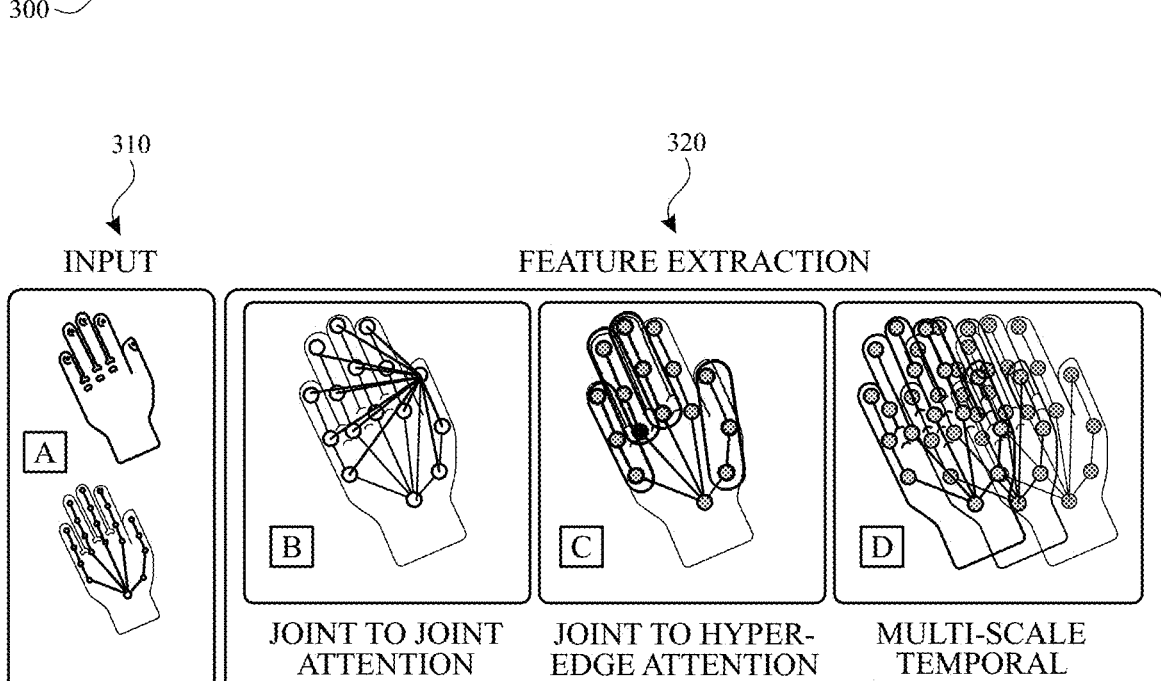
A
B    JOINT TO JOINT
ATTENTION
C    JOINT TO HYPER-
EDGE ATTENTION
D    MULTI-SCALE
TEMPORAL
CONVOLUTION
KEYPOINT
EXTRACTION    PRE-TRAINING
330
332    FEW-SHOT LEARNING    334
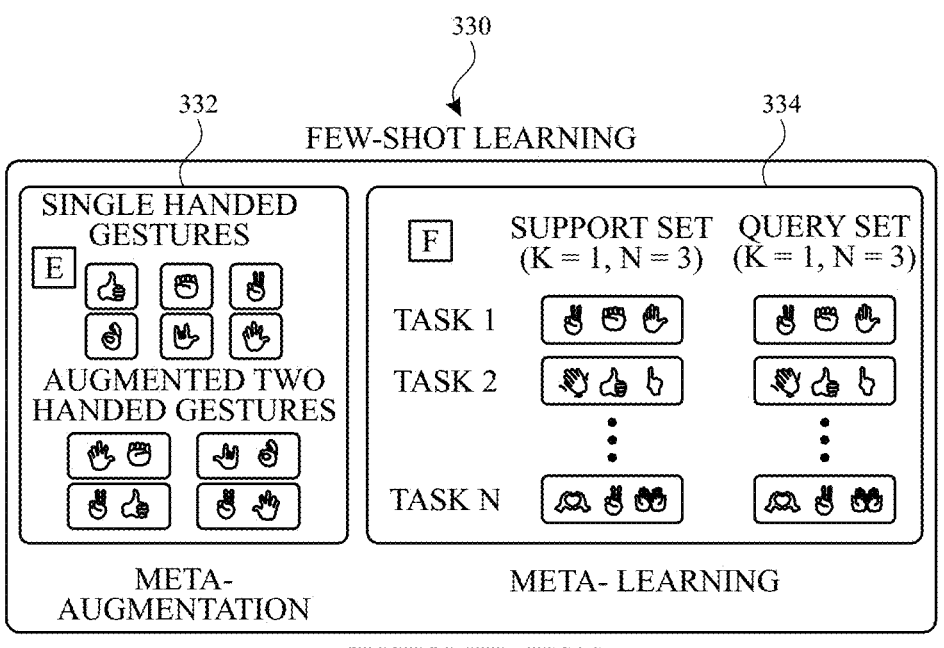
SINGLE HANDED
GESTURES
E
AUGMENTED TWO
HANDED GESTURES
F    SUPPORT SET    QUERY SET
(K = 1, N = 3)    (K = 1, N = 3)
TASK 1
TASK 2
TASK N
META-
AUGMENTATION    META-LEARNING
CUSTOMIZATION
*FIG. 3*

810

DOUBLE THUMBS UP

DRIVE

VISION-BASED HAND GESTURE CUSTOMIZATION

CROSS-REFERENCE TO RELATED APPLICATION(S)

This application claims the benefit of U.S. Provisional Application Ser. No. 63/580,991, entitled "VISION-BASED HAND GESTURE CUSTOMIZATION," and filed on Sep. 6, 2023, the disclosure of which is expressly incorporated by reference herein in its entirety.

TECHNICAL FIELD

The present description generally relates to vision-based hand gesture customization.

BACKGROUND

Different hand gestures performed by a user can be detected and analyzed to facilitate user interaction with digital interfaces. Computer hardware advancements have been applied to interfaces enhance various industry applications. This technology may employ computer vision for recognizing gestures, serving various applications, such as gaming and virtual reality.

BRIEF DESCRIPTION OF THE DRAWINGS

Certain features of the subject technology are set forth in the appended claims. However, for purpose of explanation, several embodiments of the subject technology are set forth in the following figures.

FIG. 2 is a flow chart of an example process that may be performed for vision-based hand gesture customization in accordance with one or more implementations.

FIG. 3 conceptually illustrates an example of a system flow diagram of vision-based hand gesture customization in accordance with one or more implementations.

DETAILED DESCRIPTION

Figure 1:
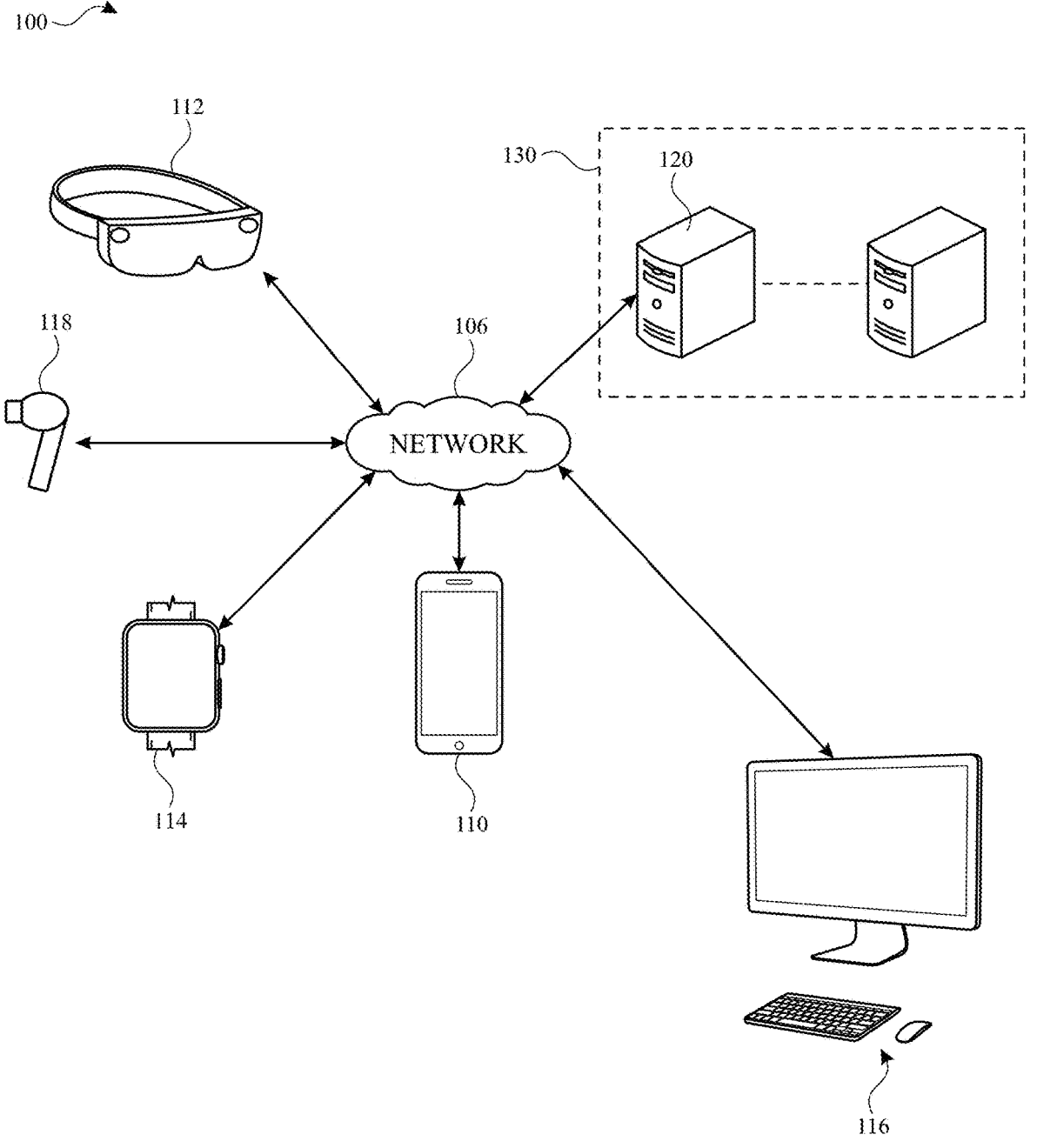
FIG. 1 illustrates an example network environment in accordance with one or more implementations.

The detailed description set forth below is intended as a description of various configurations of the subject technol-ogy and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, struc-tures and components are shown in block diagram form in order to avoid obscuring the concepts of the subject tech-nology.

Machine learning has seen a significant rise in popularity in recent years due to the availability of training data, and advances in more powerful and efficient computing hard-ware. Machine learning may utilize models that are executed to provide predictions in particular applications, for example, hand gesture recognition.

Hand gesture recognition can facilitate seamless and intuitive communication between humans and machines, with applications ranging from virtual reality to gaming and smart home control. However, automatic recognition of hand gestures has presented challenges in supporting human-computer interaction applications across diverse domains. A need has arisen to move beyond the mere identification of predefined gestures, allowing users to define and personalize their own gestures by customization. This customization can yield numerous advantages, includ-ing enhanced memorability, increased efficiency, and broader inclusivity for individuals with specific needs, for example. Effectively enabling customization may demand an efficient and user-friendly data collection procedure while also addressing a challenge of learning from limited samples, referred to as Few-Shot Learning (FSL).

FSL presents a demanding task in which models may effectively synthesize prior knowledge with minimal new information to avoid overfitting. Various algorithms have been explored to address the challenges of FSL in gesture recognition, encompassing strategies such as transfer learn-ing, fine-tuning, and augmenting few-shot data through various techniques. Nevertheless, the suitability of these strategies can be limited, particularly when the source ges-tures, upon which the model was initially trained, diverge significantly from the target gestures, involving a novel set of classes. Furthermore, different types of data necessitate distinct augmentation approaches. For example, augmenta-tion techniques suitable for images may not be appropriate for time-series sensor data. Generative modeling has encountered challenges, such as issues related to data hal-lucination, rendering them less reliable for data synthesis. Alternatively, aspects of meta-learning can address the chal-lenges of FSL by enhancing models' capacity to effectively learn.

Embodiments of the subject technology address the chal-lenges of FSL in gesture recognition by introducing a comprehensive framework for gesture customization based on meta-learning. In contrast to other techniques that may support only limited types of gestures, embodiments of the subject technology provide for utilizing one or more imag-ing sensors, such as RGB cameras, and accommodates a wide spectrum of gestures, encompassing static, dynamic, single-handed, and two-handed gestures. The subject tech-nology enables customization with a single demonstration (e.g., by capturing a gesture over a sequence of frames). The subject technology incorporates graph transformers, transfer learning, and meta-learning techniques. In this regard, few-shot learning is facilitated through the utilization of a pre-trained graph transformer deep neural network, bolstered by the integration of both meta-learning and meta-augmentation techniques. Initially, a graph transformer is trained using a publicly available dataset, creating a pre-trained model. Subsequently, a meta-learning algorithm, coupled with meta-augmentation techniques, trains a meta-learner, leveraging minimal user samples to enhance model performance. The efficacy of this trained model for gesture customization is evaluated through a query dataset having a limited number of distinct gestures, including both static and dynamic forms, as well as single and two-handed gestures. Additionally, aspects of the subject technology are implemented on a cross-platform application, allowing users to seamlessly utilize hand gestures defined on platforms with varying camera angles. The cross-platform application also establishes comprehensive guidance and a manual for vision-based gesture customization with aspects of the subject technology.

Embodiments of the subject technology provide for a computer-implemented method that includes producing a first trained machine learning model by training a neural network with a first dataset having a plurality of skeleton-based feature representations associated with a first plurality of hand gestures to predict a classification for one or more of the first plurality of hand gestures. The method also includes generating a second dataset having a limited number of training samples representing a second plurality of hand gestures that are customized by users. The method also includes selecting one or more gesture classification tasks from the second dataset, each of the one or more gesture classification tasks comprising a support set and a query set associated with the second plurality of hand gestures. The method also includes producing a second trained machine learning model by training the first trained machine learning model with the support set and the query set of the one or more gesture classification tasks to predict a classification for one or more of the second plurality of hand gestures customized by users.

Implementations of the subject technology improve the ability of a given electronic device to provide sensor-based, machine-learning generated feedback to a user (e.g., a user of the given electronic device). These benefits therefore are understood as improving the computing functionality of a given electronic device, such as an end user device that may generally have less computational and/or power resources available than, e.g., one or more cloud-based servers.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 112, an electronic device 114, an electronic device 116, an electronic device 118, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, the electronic device 112, the electronic device 114, the electronic device 116, the electronic device 118, and the server 120; however, the network environment 100 may include any number of electronic devices and any number of servers or a data center including multiple servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a mobile electronic device (e.g., smartphone). The electronic device 110 may be, and/or may include all or part of, the electronic system discussed below with respect to FIG. 10.

The electronic device 112 may be, for example, a desktop computer, a portable computing device such as a laptop computer, a smartphone, a peripheral device (e.g., a digital camera, headphones), a tablet device, or a wearable device such as a head mountable portable system, that includes a display system capable of presenting a visualization of an extended reality environment to a user. In FIG. 1, by way of example, the electronic device 112 is depicted as a head mountable portable system. The electronic device 112 may be, and/or may include all or part of, the electronic system discussed below with respect to FIG. 10.

The electronic device 114 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 114 is depicted as a watch. The electronic device 114 may be, and/or may include all or part of, the electronic system discussed below with respect to FIG. 10.

The electronic device 116 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 116 is depicted as a desktop computer. The electronic device 116 may be, and/or may include all or part of, the electronic system discussed below with respect to FIG. 10.

The electronic device 118 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 118 is depicted as an earphone. The electronic device 118 may be, and/or may include all or part of, the electronic system discussed below with respect to FIG. 10.

In one or more implementations, one or more of the electronic devices 110-118 may provide a system for training a machine learning model using training data, where the trained machine learning model is subsequently deployed to one or more of the electronic devices 110-118. Further, one or more of the electronic devices 110-118 may provide one or more machine learning frameworks for training machine learning models and/or developing applications using such machine learning models. In an example, such machine learning frameworks can provide various machine learning algorithms and models for different problem domains in machine learning. In an example, the electronic device 110 may include a deployed machine learning model that provides an output of data corresponding to a prediction or some other type of machine learning output. In one or more implementations, training and inference operations that involve individually identifiable information of a user of one or more of the electronic devices 110-118 may be performed entirely on the electronic devices 110-118, to prevent exposure of individually identifiable data to devices and/or systems that are not authorized by the user.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files. In an implementation, the server 120 may function as a cloud storage server that stores any of the aforementioned content generated by the above-discussed devices and/or the server 120.

The server 120 may provide a system for training a machine learning model using training data, where the trained machine learning model is subsequently deployed to the server 120 and/or to one or more of the electronic devices 110-118. In an implementation, the server 120 may train a given machine learning model for deployment to a client electronic device (e.g., the electronic device 110, the electronic device 112, the electronic device 114, the electronic device 116, the electronic device 118). In one or more implementations, the server 120 may train portions of the machine learning model that are trained using (e.g., anonymized) training data from a population of users, and one or more of the electronic devices 110-118 may train portions of the machine learning model that are trained using individual training data from the user of the electronic devices 110-118. The machine learning model deployed on the server 120 and/or one or more of the electronic devices 110-118 can then perform one or more machine learning algorithms. In an implementation, the server 120 provides a cloud service that utilizes the trained machine learning model and/or continually learns over time.

In the example of FIG. 1, the electronic device 110 is depicted as a smartphone. However, it is appreciated that the electronic device 110 may be implemented as another type of device, such as a wearable device (e.g., a smart watch or other wearable device). The electronic device 110 may be a device of a user (e.g., the electronic device 110 may be associated with and/or logged into a user account for the user at a server). Although a single electronic device 110 is shown in FIG. 1, it is appreciated that the network environment 100 may include more than one electronic device, including more than one electronic device of a user and/or one or more other electronic devices of one or more other users.

FIG. 2 is a flow chart of an example process that may be performed for vision-based hand gesture customization in accordance with one or more implementations. For explanatory purposes, the process 200 is primarily described herein with reference to the electronic device 110 of FIG. 1. However, the process 200 is not limited to the electronic device 110 of FIG. 1, and one or more blocks (or operations) of the process 200 may be performed by one or more other components of other suitable devices and/or servers. Further for explanatory purposes, some of the blocks of the process 200 are described herein as occurring in serial, or linearly. However, multiple blocks of the process 200 may occur in parallel. In addition, the blocks of the process 200 need not be performed in the order shown and/or one or more blocks of the process 200 need not be performed and/or can be replaced by other operations. In one or more implementations, the operations of the process 200 will be discussed with reference to FIG. 3 for purposes of explanation and brevity of discussion. FIG. 3 conceptually illustrates another example of a system flow diagram 300 of vision-based hand gesture customization in accordance with one or more implementations. The system flow diagram 300 includes an input stage 310, a model architecture stage 320 and a few-shot learning stage 330.

As illustrated in FIG. 2, at block 202, an apparatus (e.g., the electronic device 110, 112, 114, 116, 118) receives input data having image representations of a first collection of hand gestures corresponding to different types of gestures. At block 204, the apparatus extracts, for each of the first collection of hand gestures, one or more features from at least one of the image representations of the first collection of hand gestures to produce a skeleton-based feature representation of a corresponding hand gesture of the first collection of hand gestures. Referring to FIG. 3, particularly in the input stage 310, feature extraction from input hand gesture samples can be performed. As discussed above, the automatic recognition of hand gestures has constituted a persistent challenge within the realm of human-computer interaction. Various approaches to detecting hand gestures have been explored, encompassing the utilization of distinct vision-based modalities (e.g., cameras, infrared ranging), acoustics, and wearable inertial measurement units (IMUs). Notably, the RGB camera stands as a promising device for tracking human hand movements. It empowers the detection of a diverse array of intricate gestures, furnishing substantial information for reliable gesture detection across different applications, such as sign language translation.

Embodiments of the subject technology employ the RGB modality to provide comprehensive information supporting a wide range of gestures, including static, dynamic, as well as single and two-handed gestures. Noteworthy approaches into single RGB camera-based static and dynamic hand gesture recognition have been undertaken. These approaches frequently hinge on raw RGB pixel values or hand skeleton key points as input features. Body skeleton features may be particularly advantageous for human action recognition, given their availability through certain sensors, or robust pose estimation algorithms. Furthermore, they may present a more reliable alternative to traditional RGB or depth-based methodologies, facilitating diverse real-world applications while addressing specific computer vision challenges like occlusion, illumination, and appearance variations. The ascendancy of skeleton features in human action recognition, coupled with advancements in hand pose estimation, positions hand skeleton features as a desirable asset for gesture recognition.

While other approaches in gesture recognition often cater to specific gesture types and assume access to extensive predefined gesture datasets for classifier training, the multifaceted advantages of enabling customized user-defined gestures have become apparent. These benefits encompass not only enhanced memorability and interaction efficiency but also heightened accessibility for individuals with physical disabilities. Customizing gestures may include having models learn from a minimal set of user-provided samples, a distinctive challenge, particularly for deep learning models that traditionally require substantial data volumes. Addressing these challenges is undertaken through the leveraging of advanced transformer architecture capabilities as illustrated in the model architecture stage 320 and the application of a meta-augmentation stage 332 and a meta-learning stage 334 as illustrated in the few-shot learning stage 330.

A challenge inherent to gesture customization lies in a requirement to uphold an efficient and effective data collection process that facilitates a user-friendly experience. Although other models may necessitate minimal training data for gesture recognition, these other models tend to either focus on a particular gesture type (e.g., one-handed dynamic) or simplify gestures by translating the static component into hand shape and the dynamic component into palm motion. However, these simplifications do not adequately capture the complexity of numerous gestures. For example, the "scissors" gesture (e.g., 414 of FIG. 4) utilized for cutting actions predominantly involves finger movement, while the "pinch drag" gesture (e.g., 412 of FIG. 4) combines palm and finger movements concurrently. Addressing such complexity, the subject technology accommodates a diverse spectrum of gestures, encompassing one-handed, two-handed, static, and dynamic gestures. This may be realized through an end-to-end computer vision pipeline, facilitated by a transformer model that implicitly captures spatial and temporal features. To avert the drawbacks of hand-crafted features that exhibit reduced accuracy for intricate hand gestures, the subject technology relies on publicly accessible datasets. The subject technology further streamlines customization by utilizing solely one demonstration during the registration process, as described with reference to FIG. 9. This may be achieved through the integration of data augmentation (or meta-augmentation) and meta-learning methodologies as illustrated in the few-shot learning stage 330, surmounting the hurdles posed by learning from a limited sample set.

In the input stage 310, the subject technology may employ a two-dimensional (2D) hand pose estimation model to extract a skeletal structure from an image representation of a hand gesture. In some aspects, two distinct hand graphs are formulated-one for each hand-which are subsequently merged for the graph transformer model in the model architecture stage 320. In this graph, individual nodes correspond to specific landmarks on each hand, interconnected through a hierarchical structure. For instance, all knuckles or metacarpophalangeal (MCP) joints are linked to the wrist point, each knuckle is connected to the corresponding finger's middle joint or proximal interphalangeal (PIP) joint, and so forth. The skeletal structure may include a predefined number of key landmarks. For example, a skeletal structure may include 21 key landmarks, spanning three points mapped to each finger for a total of 15 key landmarks across the fingers, five points mapped respectively to the knuckles, and one reference point corresponding to the wrist. These skeletal structure landmarks may be expressed through x- and y-coordinates and serve as the input features to the model architecture stage 320. In one or more other implementations, the input stage 310 may replace the skeleton-based feature representations of hand gestures with any graph representable data such as body key points.

At block 206, the apparatus produces a first trained machine learning model by training a neural network with a first dataset having a set of skeleton-based feature representations associated with a first collection of hand gestures to predict a classification for one or more of the first collection of hand gestures. In one or more implementations, the model architecture stage 320 may include implementation of a graph transformer model configured for human action recognition such as vision-based hand gesture recognition, as described with reference to FIG. 7. In one or more implementations, the graph transformer model may be trained to perform hand gesture recognition tasks reliant upon temporal features, with the graph transformer model particularly adept at portraying skeletons—spatial information—by considering the interrelation between each node (e.g., joint) using an attention mechanism.

In one or more implementations, the graph transformer model may compute an attention score for distinct groups of nodes, categorized by individual fingers. This enables the generation of group-level attention maps. In one or more implementations, the graph transformer model may use a joint-to-joint attention mechanism for spatial-based gesture recognition. In one or more other implementations, the graph transformer model may use a joint-to-hyper-edge attention mechanism for spatial-based gesture recognition. In one or more other implementations, the graph transformer model may use a multi-scale temporal convolution mechanism for temporal-based gesture recognition.

In one or more implementations, model employed in the model architecture stage 320 may be tailored to be effective for hand gesture recognition. In some aspects, the model architecture may be changed according to the input type. For example, if the input type is of type image, then the model architecture can be replaced by a convolutional neural network (CNN) model.

At block 208, the apparatus generates a second dataset having number of training samples representing at least a second hand gesture customized by a user. For example, the second dataset may include single-handed gestures and augmented two-handed gestures. To accommodate an extensive array of gestures, spanning static, dynamic, single-handed, and two-handed gestures, a top-down approach may be implemented. For example, the graph transformer model in the model architecture stage 320 may process 32 frames, each frame containing 42 key points. For static and single-handed gestures, appropriate padding strategies may be applied, ensuring alignment with the dimensions of dynamic and two-handed gestures. For example, a static gesture may be duplicated from a single frame into a sequence of 32 frames to temporally align with a dynamic gesture, of which the 31 duplicate frames represent the padded frames. In another example, a static gesture may be padded by modifying certain coordinates in a frame to spatially align with a dynamic gesture and/or two-handed gesture.

The establishment of pre-training and transfer learning practices in the training of deep-learning models has yielded enhanced model accuracy and reduced training durations. In one or more implementations, the model architecture stage 320 includes pre-training of a deep-learning model, such as a graph transformer model, employing a publicly accessible dataset.

Approaches to FSL fall into two primary categories: those based on meta-learning and those that are not meta-learning-based, such as transfer learning and fine-tuning. In the context of gesture customization, approaches in non-meta-learning have been undertaken, relying substantially on transfer learning and fine-tuning with augmented data. However, uninformed fine-tuning can lead to overfitting concerns, and the augmentation of skeleton data may not consistently yield desired outcomes, depending on the nature of the gesture. For example, rotation augmentation can potentially alter a gesture class label, such as transforming a "swipe right" gesture into a "swipe up" gesture. Other prior approaches have applied FSL to gesture recognition across various domains, including electromyography, vision-based scenarios, and WiFi-based scenarios.

At block 210, the apparatus produces a second trained machine learning model by training the first trained machine learning model based at least in part on the second dataset to predict a classification for the second hand gesture customized by the user. The emergence of meta-learning for few-shot learning enables machine learning models to adapt and learn from a limited number of examples. In one or more implementations, the few-shot learning stage 330 employs a model-agnostic meta-learning algorithm to train a pre-trained hypergraph transformer model in the model architecture stage 320. This training regimen entails subjecting the hypergraph transformer model to a varied array of gesture classification tasks, equipping it with the competence to adeptly handle novel learning tasks, even when presented with a limited number of training samples. The training data may encompass 20 distinct gesture classes, as described with reference to the dataset 400 of hand gesture classes of FIG. 4, with each class having 10 samples per user. This aggregates to a total of 200 samples per user.

In one or more implementations, the subject technology expands the scope of the model-agnostic meta-learning algorithm capabilities by incorporating meta-augmentation techniques, which will be described in more detail in FIG. 4, to generate additional gesture classes. In one or more implementations, the few-shot learning stage 330 employs a model-agnostic meta-learning algorithm, which will be described in more detail in FIG. 5. Subsequently, the subject technology executes fine-tuning on this model using a graph transformer of the model architecture stage 320, culminating in outcomes for the realm of gesture customization.

Figure 4:
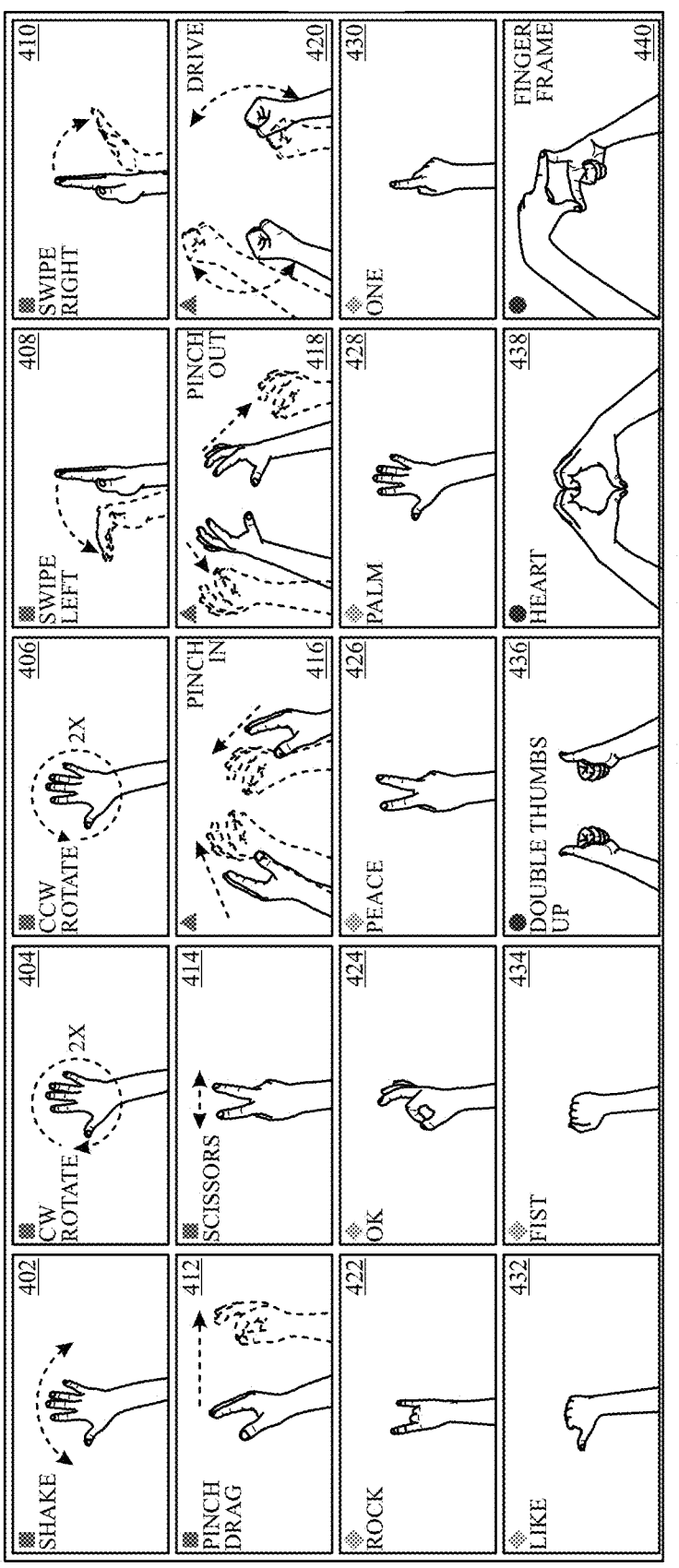
FIG. 4 is a schematic diagram illustrating an example overview of the meta-augmentation stage of FIG. 3 involving an example dataset of hand gesture classes in accordance with one or more implementations.

FIG. 4 is a schematic diagram illustrating an example overview of the meta-augmentation stage 332 of FIG. 3 involving an example dataset 400 of hand gesture classes in accordance with one or more implementations. In one or more implementations, the subject technology employs a wide array of hand gesture classes. These gestures are broadly categorized into two primary classifications: static and dynamic gestures. In one or more implementations, static gestures can refer to gestures characterized by an absence of hand movement. In one or more other implementations, dynamic gestures can refer to gestures characterized by hand movement such as a diverse range of palm, finger, or combined movements. In one or more other implementations, the subject technology employs an expanded array of gestures by incorporating both one-handed and two-handed gestures, resulting in the availability of four distinct gesture combinations. The exemplification of each gesture category is illustrated in FIG. 4. Although the dataset 400 illustrates 20 hand gesture classes, the number of hand gesture classes that can be included in the dataset 400 is arbitrary and can vary depending on implementation.

As illustrated in FIG. 4, an enumeration of these gesture categories is provided, alongside those employed during the pre-training phase. The subject technology employs a selection criterion to produce the dataset 400 of hand gesture classes. The selection criterion may encompass considerations related to hand and finger motions, in addition to gesture similarities. In one or more implementations, the category of single-handed static gestures within the dataset 400 of hand gesture classes may encompass universally recognized gestures such as "like" (e.g., 432), "palm" (e.g., 428), "ok" (e.g., 424), "peace" (e.g., 426), "one" (e.g., 430), "rock" (e.g., 422), and "fist" (e.g., 434), which exhibit distinct finger configurations. Among the domain of static two-handed gestures, "double thumbs up" (e.g., 436) is included in the dataset 400 of hand gesture classes, mirroring the "like" (e.g., 432) gesture albeit enacted with both hands. This selection criterion may facilitate an assessment of the pre-trained model's capacity to discern between analogous single and two-handed gestures. Additionally, the dataset 400 of hand gesture classes also may include "heart" (e.g., 438) and "finger frame" (e.g., 440) two gestures characterized by unique hand shapes. The dataset 400 of hand gesture classes may include an assortment of dynamic gestures such as "swipe left" (e.g., 408) and "swipe right" (e.g., 410) as well as "rotate clockwise" (e.g., 404) and "rotate counterclockwise" (e.g., 406) and "shake" (e.g., 402). Furthermore, the dataset 400 of hand gesture classes includes gestures like "scissors" (e.g., 414) exclusively reliant on finger movements, alongside "pinch drag" (e.g., 412), "pinch zoom in" (e.g., 416) and "pinch zoom out" (e.g., 418), which incorporate both hand movements and hand shape changes for either one or both hands. The dataset 400 of hand gesture classes may include certain gestures, such as "driving" (e.g., 420) or "rotations," which facilitate demonstrating variability in the array of gestures.

In one or more other implementations, the dataset 400 includes gestures captured from egocentric and allocentric views. This gesture capture can be leveraged during training, and these gestures can be randomly sampled from various viewpoints, enabling the model to learn a view-agnostic representation of the gestures. As a result, when it comes to the testing phase (e.g., 550 of FIG. 5), the model is able to identify user's custom gestures from multiple views. To assess this capability, the model can be trained with a single demonstration from one viewpoint (e.g., egocentric) and subsequently evaluate its performance using data collected from another viewpoint (e.g., allocentric).

In alignment with any deep-learning model, meta-learning is susceptible to overfitting, particularly when confronted with limited task diversity (e.g., a dataset having a limited number of distinct classes of two-handed gestures). To address this challenge, the meta-augmentation stage 332 may be employed to generate new two-handed gesture classes from the dataset 400. These new gesture classes may be formulated by amalgamating two distinct single-handed gestures in the dataset 400 and may be treated as new gesture classification tasks for meta-learner training. During training intervals, the padded segment of a single-handed gesture may be randomly substituted with another single-handed gesture, culminating in the creation of a new two-handed gesture class.

Figure 5:
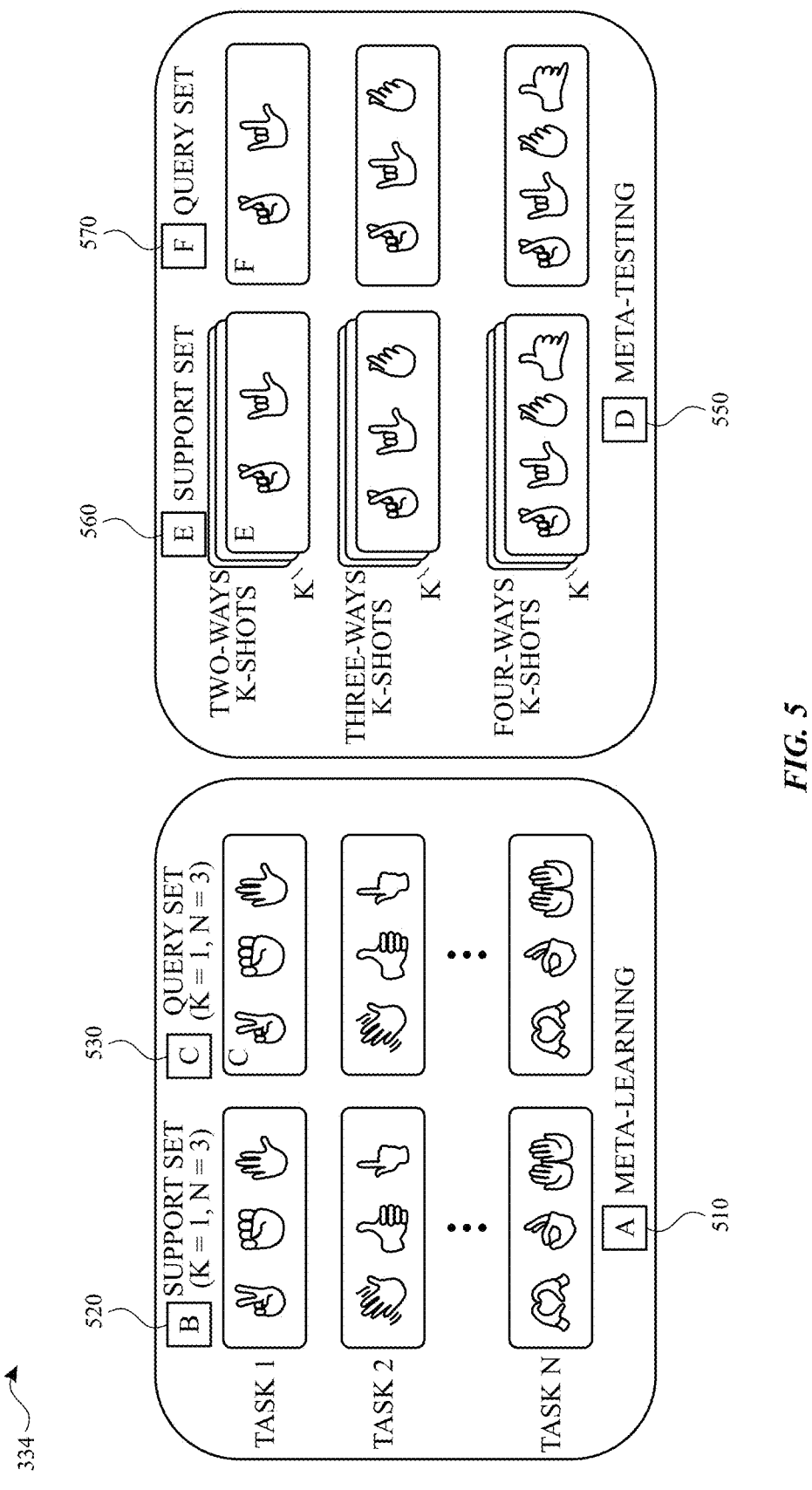
FIG. 5 is a schematic diagram illustrating an example overview of the meta learning stage of FIG. 3 for vision-based hand gesture customization in accordance with one or more implementations.

FIG. 5 is a schematic diagram illustrating an example overview of the meta-learning stage 334 of FIG. 3 for vision-based hand gesture customization in accordance with one or more implementations. Customization entails the submission of a limited set of individual gesture samples by users. Furthermore, the entire procedure, spanning from gesture registration, as described with reference to 910 of FIG. 9, to the acquisition of a trained model, as described with reference to 320 of FIG. 3, is designed to be a streamlined process. The deployment of deep learning models typically utilizes considerable computational resources, time, and a profusion of data. The endeavor to refine these models utilizing a limited number of samples frequently leads to diminished accuracy. The few-shot learning stage 430 provides for surmounting the challenges inherent to gesture customization, encompassing restricted data availability and facilitating the gesture customization's compatibility with an assortment of gesture types.

For the few-shot gesture classification scenario involving n classes and k shots, n unseen gesture classes are reserved for customization, while the remaining 20–n classes are harnessed to generate new tasks and facilitate meta-learner training (e.g., 510). During training, k samples from each class are randomly selected from the dataset, constituting a support set 520. The support set 520 may aid the meta-learner in adapting the model to a specific task at hand (e.g., Task 1, Task 2, Task N). Subsequently, an additional k random samples from the same classes are drawn, forming a query set 530 to assess model performance and compute a test error. A gradient step may be undertaken by the model to minimize the test error. Following the meta-learner's training (e.g., 510), k shots may be sampled from each of the n unseen classes to acclimate the model to the new gestures. The model's performance is subsequently tested (e.g., 550) on the remaining samples from the same user. In one or more implementations, a stochastic gradient descent optimizer featuring a consistent learning rate of 0.025 is employed, and the training of the model is continued until convergence is attained.

Following the training of the meta learner, meta testing 550 is performed. The meta testing 550 includes a support set 560 and a query set 570. The characterization of each class in the support set 560 aligns with a 'n-way k-shot' paradigm, in which 'n' designates the count of new gestures and 'k' represents the number of shots (or demonstrations) allocated in the support set 560. Our approach is assessed across diverse scenarios encompassing values such as n=2, n=3, n=4, and 0<k<5. The complete enumeration of feasible gesture combinations would necessitate an exorbitant quantity of iterations, estimated at $$\binom{20}{2} \cdot \binom{20}{3} \cdot \binom{20}{4} \cdot 21,$$

thus rendering it computationally infeasible. To surmount this challenge, the meta testing 550 employs a hybrid strategy, in which designated gestures are incorporated manually, and vacant positions are supplemented with random gestures. Subsequently, an additional k random samples from the same classes are drawn, forming the query set 570 to further assess model performance.

Figure 6:
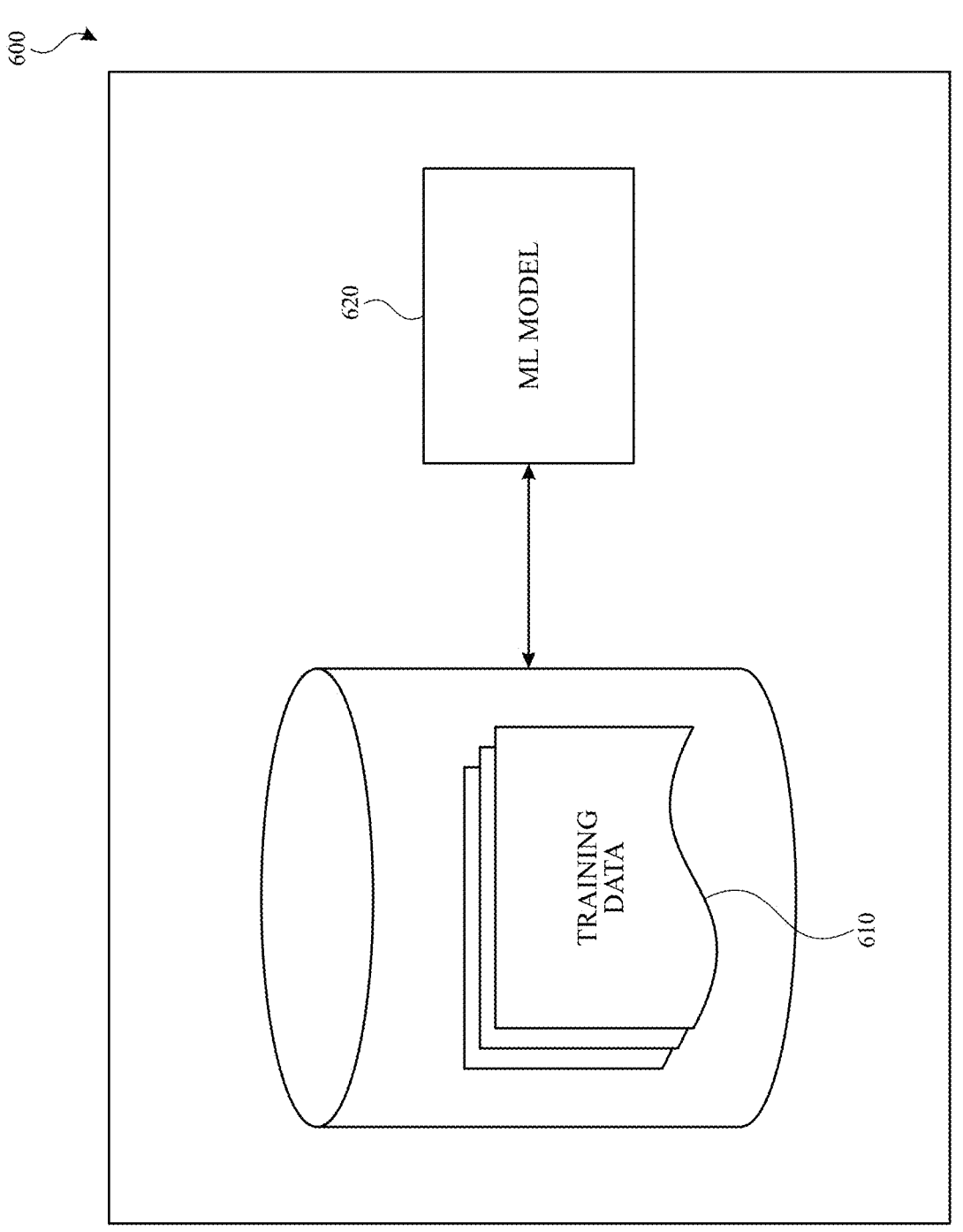
FIG. 6 illustrates an example computing architecture for a system providing for vision-based hand gesture customization in accordance with one or more implementations.

FIG. 6 illustrates an example computing architecture for a system providing for vision-based hand gesture customization in accordance with one or more implementations. For explanatory purposes, the computing architecture is described as being provided by an electronic device 600, such as by a processor and/or memory of the server 120, or by a processor and/or a memory of any other electronic device, such as the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the electronic device 600 includes training data 610 for training a machine learning model. In an example, the server 120 may utilize one or more machine learning algorithms that uses training data 610 for training a machine learning (ML) model 620. Machine learning model 620 may include one or more neural networks.

Training data 610 may include a training dataset composed of training samples of hand gestures corresponding to different types of gestures for a user of the electronic device 110, and/or a population of other users. In one or more implementations, training data 610 also may include a training dataset composed of skeleton data corresponding to hand gestures of different types of gestures intended for a pre-trained model to predict a hand gesture of a user. In one or more implementations, the training data 610 also may include embedding data for the pre-trained model. In some aspects, the quality of the embedding space in the training data 610 for the pre-trained model significantly influences the accuracy of downstream hand gesture classification tasks, including hand gesture customization. Hence, the undertaking of pre-training with the training data 610 to include a high-quality dataset that can boast ample gesture class diversity and a profusion of training samples is substantially desirable. Additionally, the aggregation of data from diverse individual user can facilitate capturing inter-subject variations. In one or more implementations, the training data 610 may include a dynamic hand gesture dataset that is selected based at least in part on a comprehensive array of hand gesture categories, each category of hand gestures being characterized by one or more hand movements. In one or more other implementations, the training data 610 may encapsulate training data contributed by a distinct number of individual users, presenting two alternative methods for performing each hand gesture-single finger usage or whole-hand usage. In one or more other implementations, four hand gestures (shake, swipe left and right, clockwise rotation, counterclockwise rotation, among others) can be excluded from the training data 610 as they may be referred to as an initial training dataset that is incorporated for the purpose of evaluating the pre-trained model.

Figure 7:
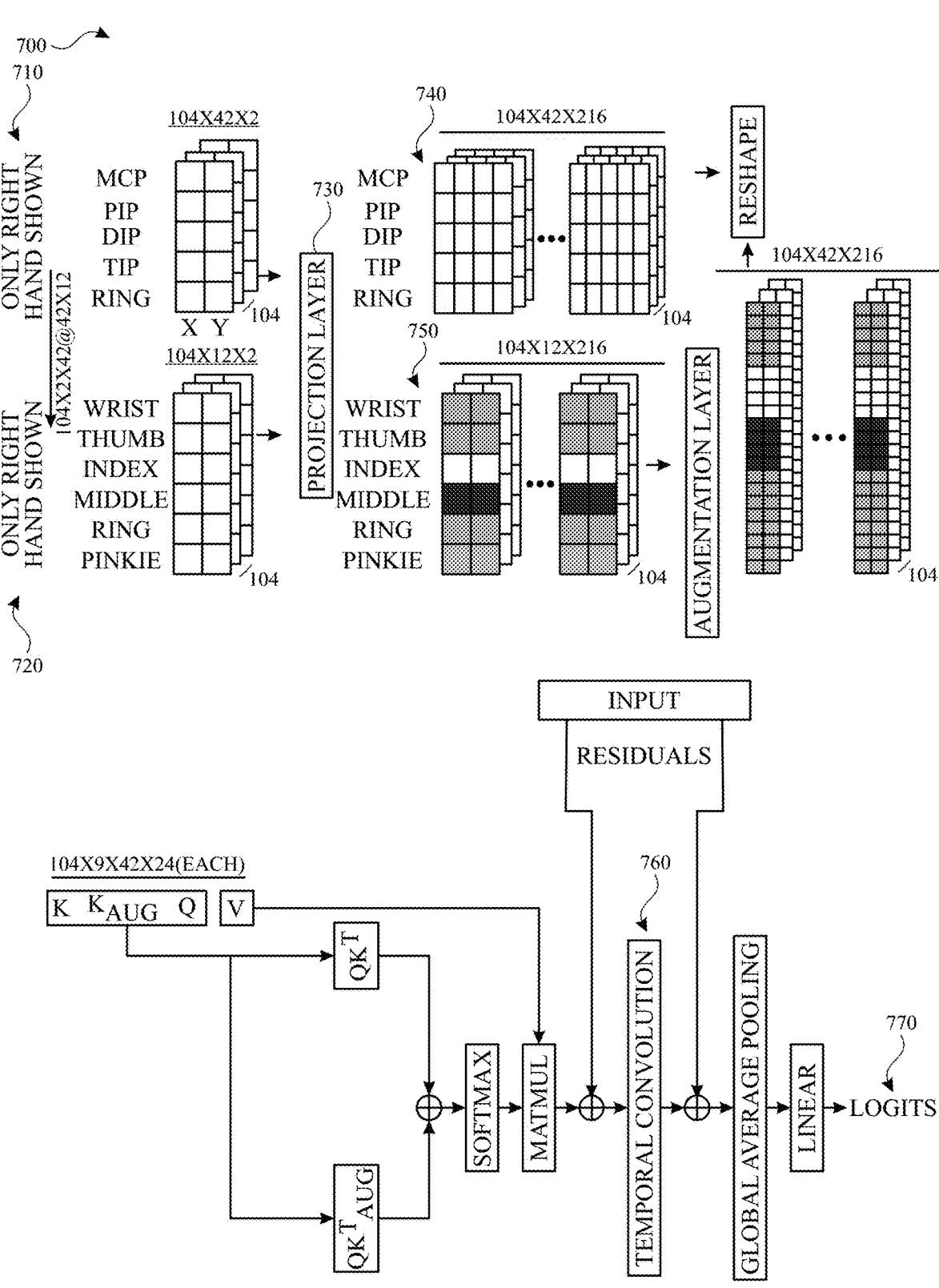
FIG. 7 illustrates an example transformer architecture of the ML model of FIG. 6 in accordance with one or more implementations of the subject technology.

FIG. 7 illustrates an example transformer architecture 700 of the ML model 620 in accordance with one or more implementations of the subject technology. The subject technology involves utilizing a graph transformer model for human action recognition to represent the human body skeleton for action recognition purposes. In one or more implementations, the transformer architecture 700 represents a graph transformer architecture. The ML model 620 can be adapted to recognize hand gestures effectively. For example, the transformer architecture 700 can be adept at capturing spatial information by considering relationships between nodes (e.g., joints) using an attention mechanism. In one or more implementations, two separate hand graphs are created, one for each hand, and then merged for the transformer architecture 700. Each node in the hand graph represents a specific landmark on the hand, with connections established based on finger joints. For example, all the knuckle joints are linked to the wrist point. Each knuckle in a finger is connected to the corresponding finger's middle joint. Each middle joint is connected to an end joint or distal interphalangeal (DIP) joint, and each end joint is connected to the fingertip. Additionally, for every edge from point A to B, an edge from point B to A is also added to the graph.

The transformer architecture 700 can receive keypoint data 710 and joint group data 720 (e.g., fingers), project them into higher dimensions via a projection layer 730 and calculate respective attention maps to extract spatial features of the keypoint data 710 and the joint group data 720. To accommodate various gestures, a top-down approach is employed. The transformer architecture 700 can process a specified number of frames (e.g., 104 frames), each frame containing a predefined number of keypoints (e.g., 42). For static gestures, zero-padding can be applied to the temporal dimension, while "same"-padding can be applied to the spatial dimension for single-handed gestures. Actual data can be populated for dynamic and two-handed gestures, enabling the development of a unified model capable of handling all gesture types.

The transformer architecture 700 can compute attention scores for distinct finger groups. These node groups can be defined based on individual fingers, creating separate groups for the thumb, index, middle, ring, and pinkie fingers, facilitating the generation of group-level attention maps. For example, the transformer architecture 700 highlights the process of obtaining two attention maps, namely a joint-to-joint attention map 740 and a joint-to-group attention map 750. The spatial and temporal features are then aggregated through temporal convolutions 760 to yield a final output 770.

FIGS. 8A-8E illustrate an example visualization of the joint-to-joint attention map 740 of FIG. 7 in accordance with one or more implementations of the subject technology. These attention map visualizations of gestures (e.g., a "one" gesture 820 of FIG. 8A, an "ok" gesture 830 of FIG. 8A, a "fist" gesture 840 of FIG. 8B, a "finger frame" gesture 850 of FIG. 8B, a "swipe right" gesture 860 of FIG. 8D, a "rock" gesture 870 of FIG. 8D, a "double thumps up" gesture 880 of FIG. 8E, a "drive" gesture 890 of FIG. 8E) can be generated by averaging the attention scores across all attention heads (e.g., N=9). In one or more implementations, each attention map is either a 21×21 (one-handed) matrix or a 42×42 (two-handed) matrix averaged across all the attention heads.

Figure 8A:
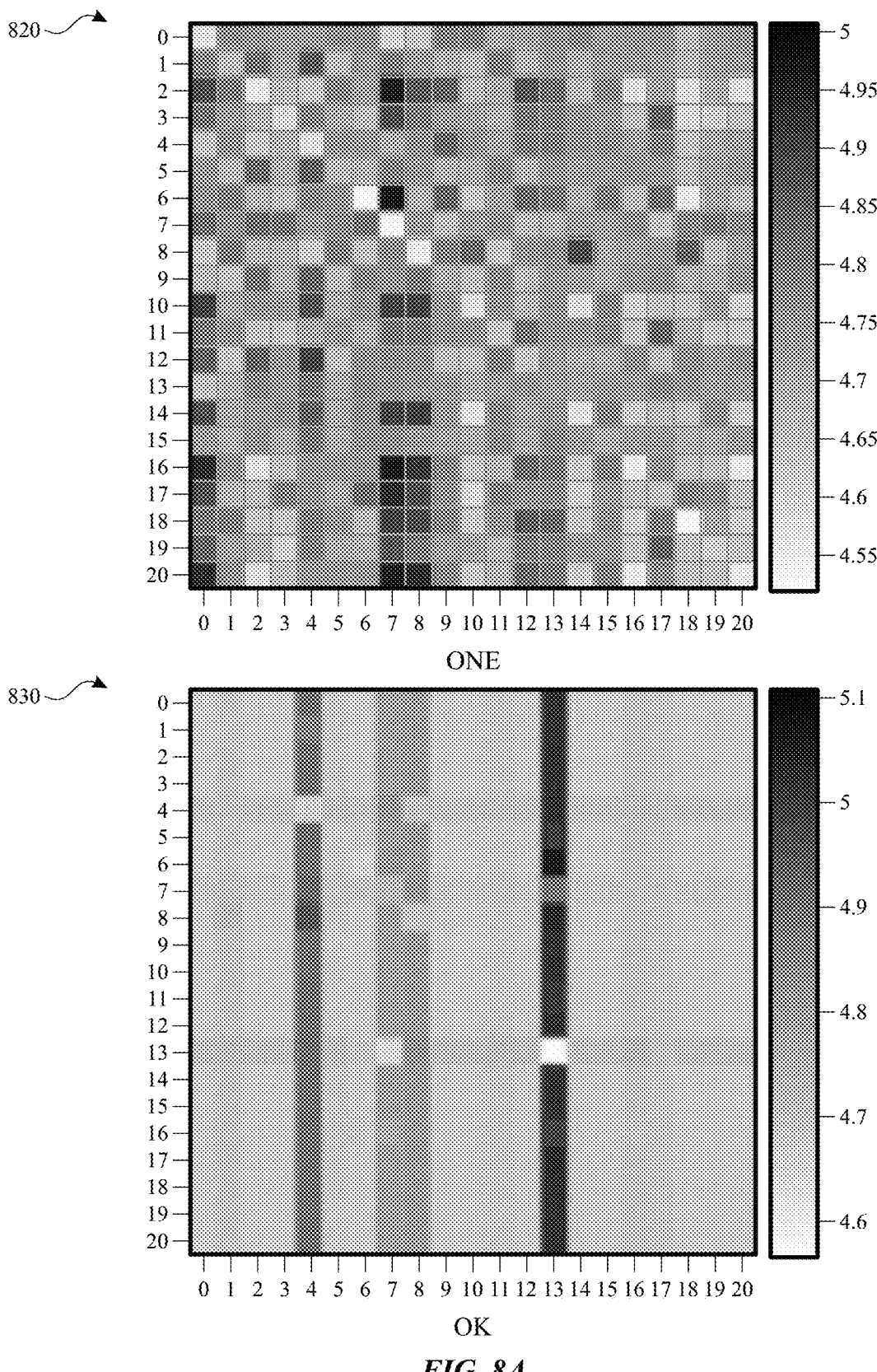
FIGS. 8A-8E illustrate an example visualization of the joint-to-joint attention map of FIG. 7 in accordance with one or more implementations of the subject technology.
Figure 8B:
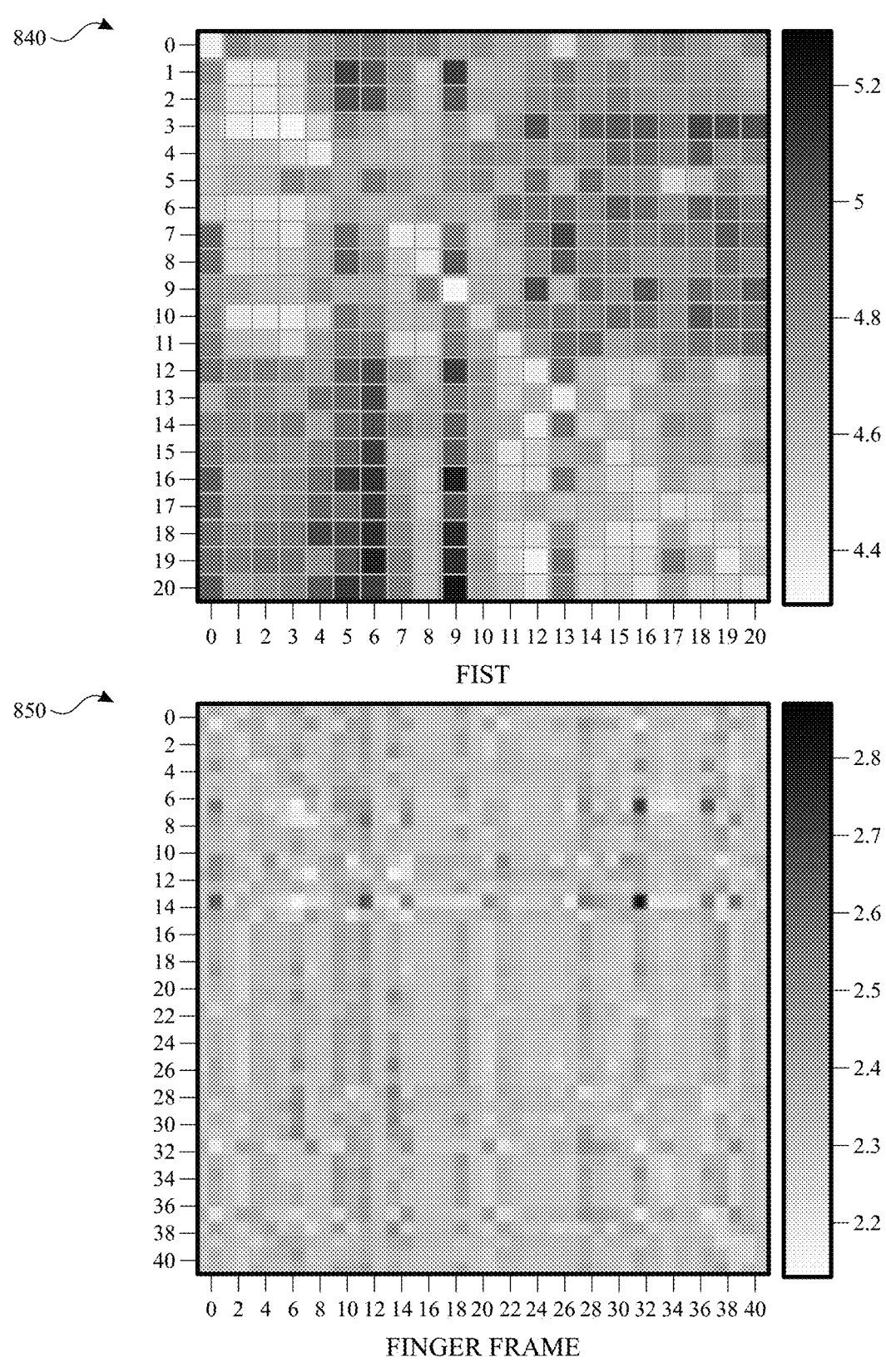
Figure 8C:
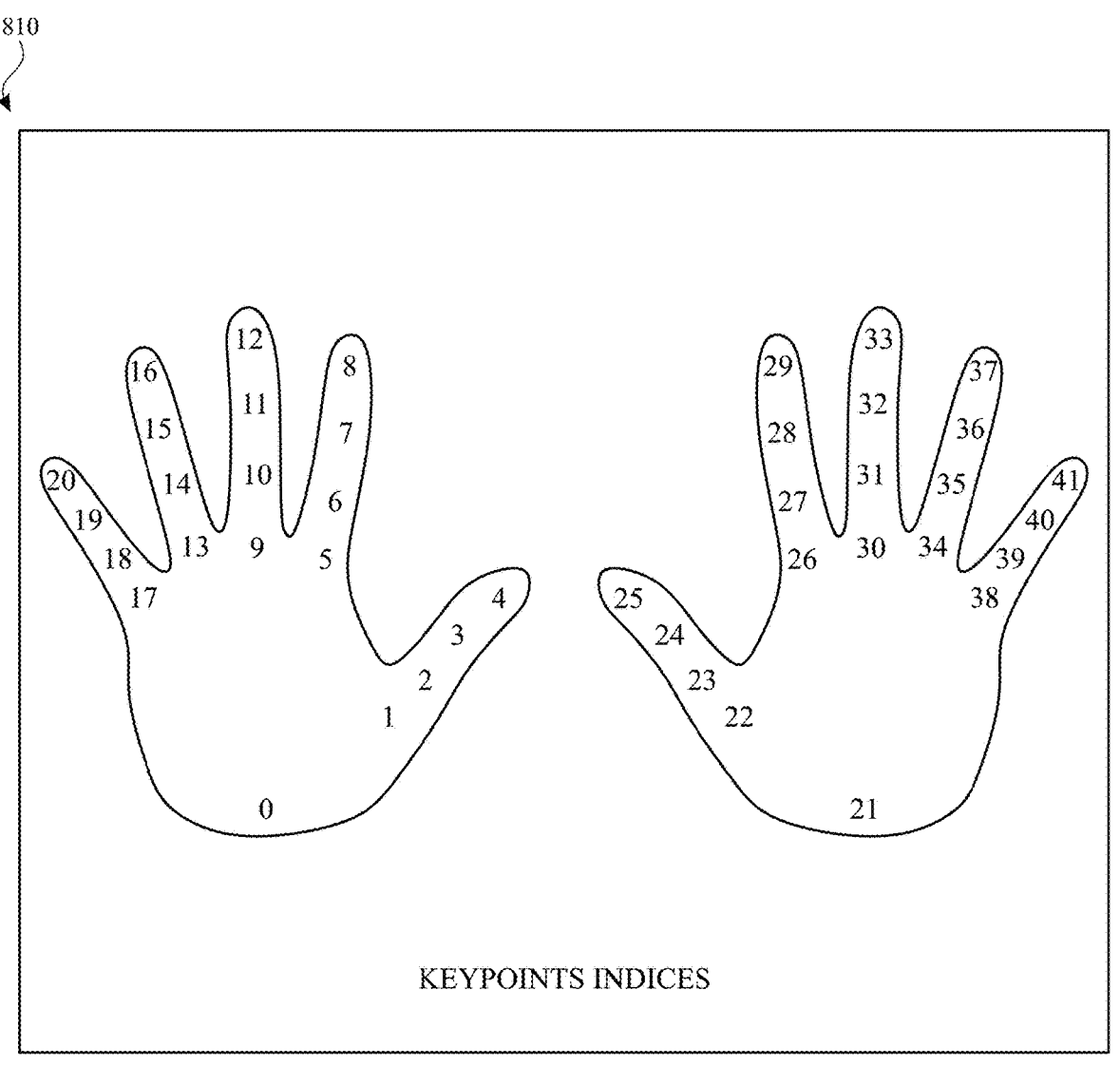
Figure 8D:
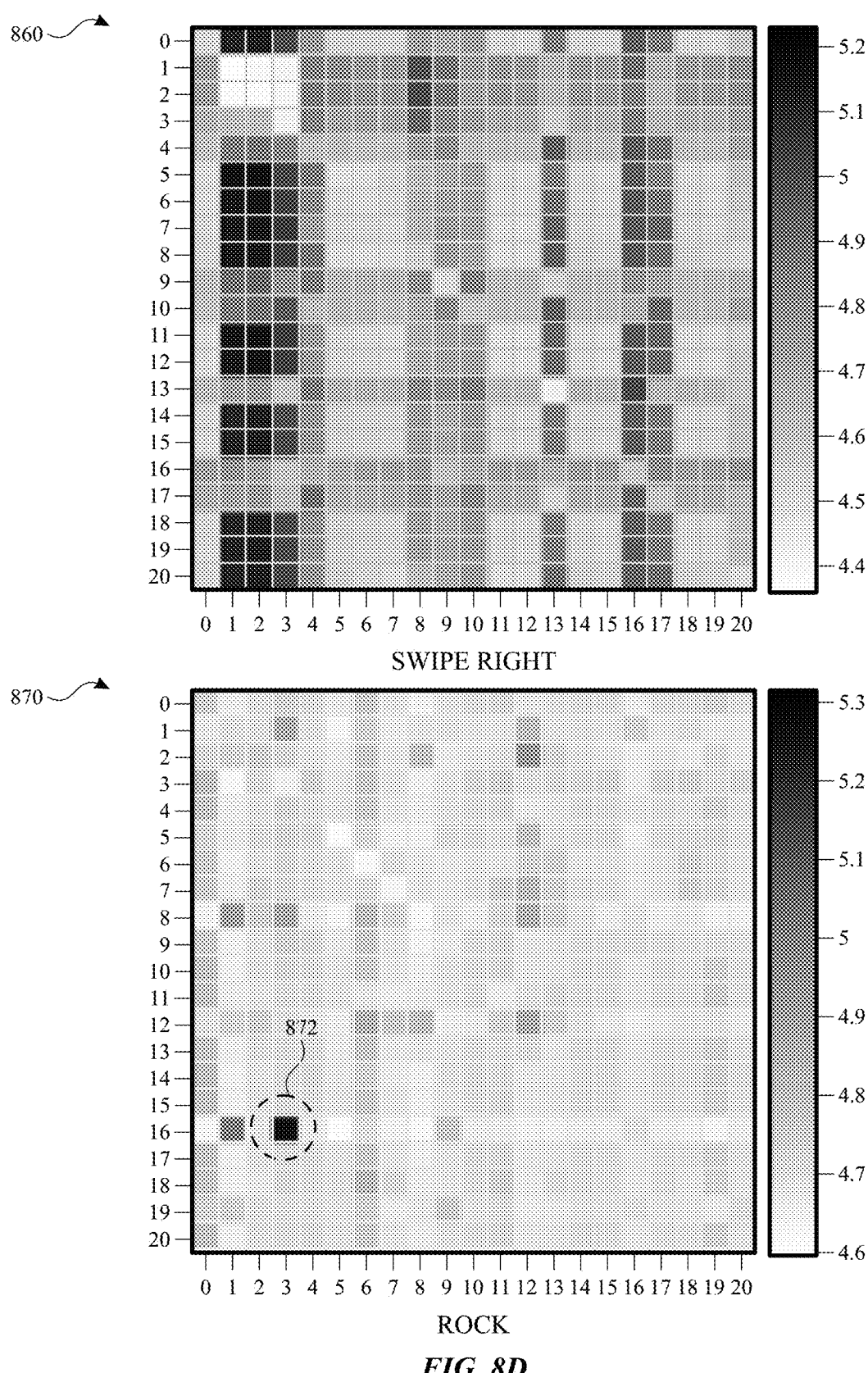
Figure 8E:
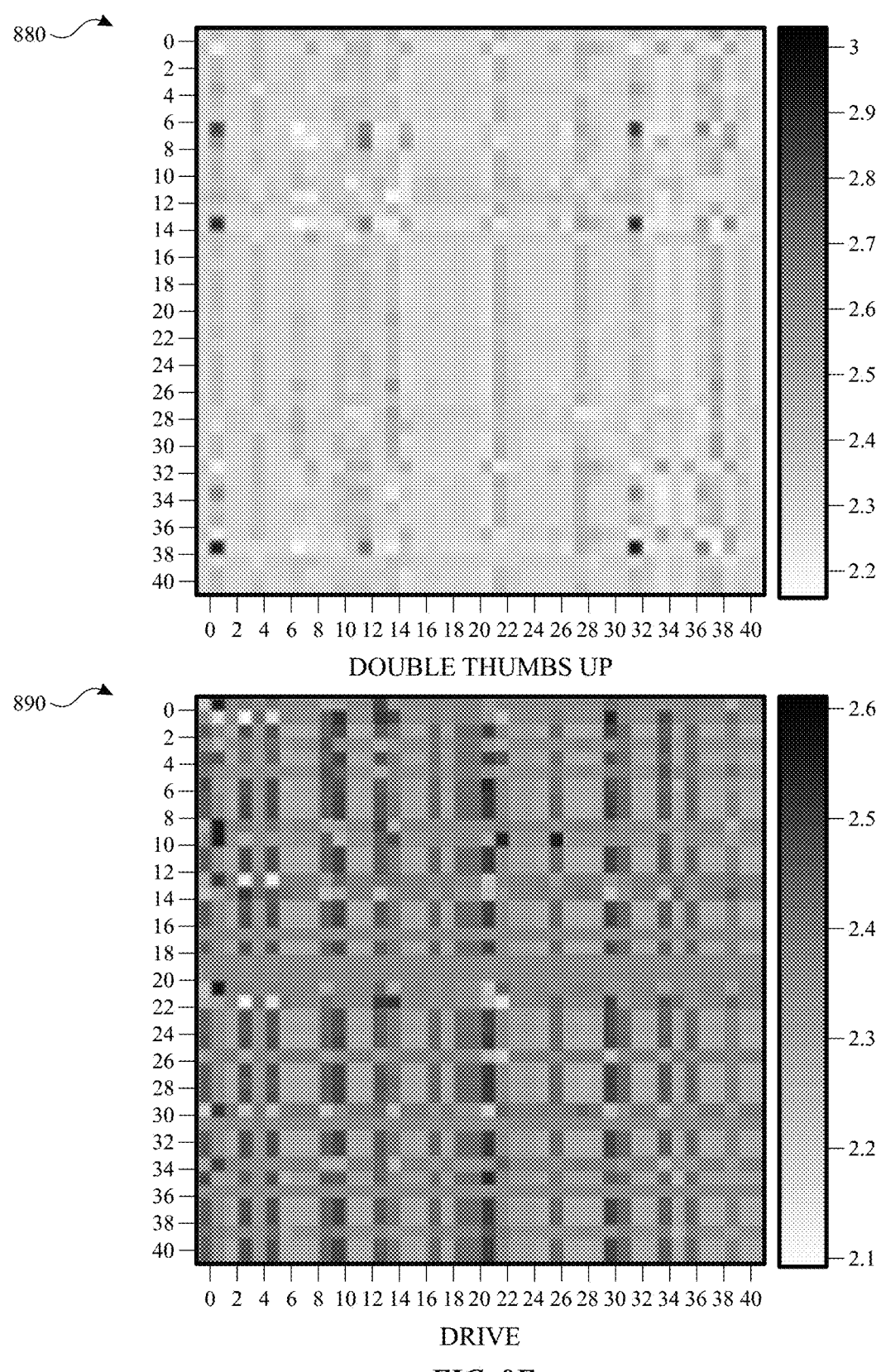

In one or more implementations, the ML model 620 can learn distinct mappings for each gesture, emphasizing the unique spatial characteristics of each gesture. In this regard, the ML model 620 can attend to different keypoint indices (e.g., 810 of FIG. 8C) of a hand based on the gesture. For example, in the attention map of the "rock" gesture 870 as illustrated in FIG. 8D, one keypoint of the ring finger (e.g., keypoint index 3 on x-axis) shows a high degree of attention (e.g., at 872) towards one keypoint of the "thumb" finger (e.g., keypoint index 16 on y-axis). In another example, in the attention map of a swipe-right gesture 860 as illustrated in FIG. 8D, most keypoints attend to the thumb keypoint indices (e.g., indices 1-4) and ring keypoint indices (e.g., indices 13-16). These observations provide valuable insights into the ML model 620 reasoning.

Figure 9:
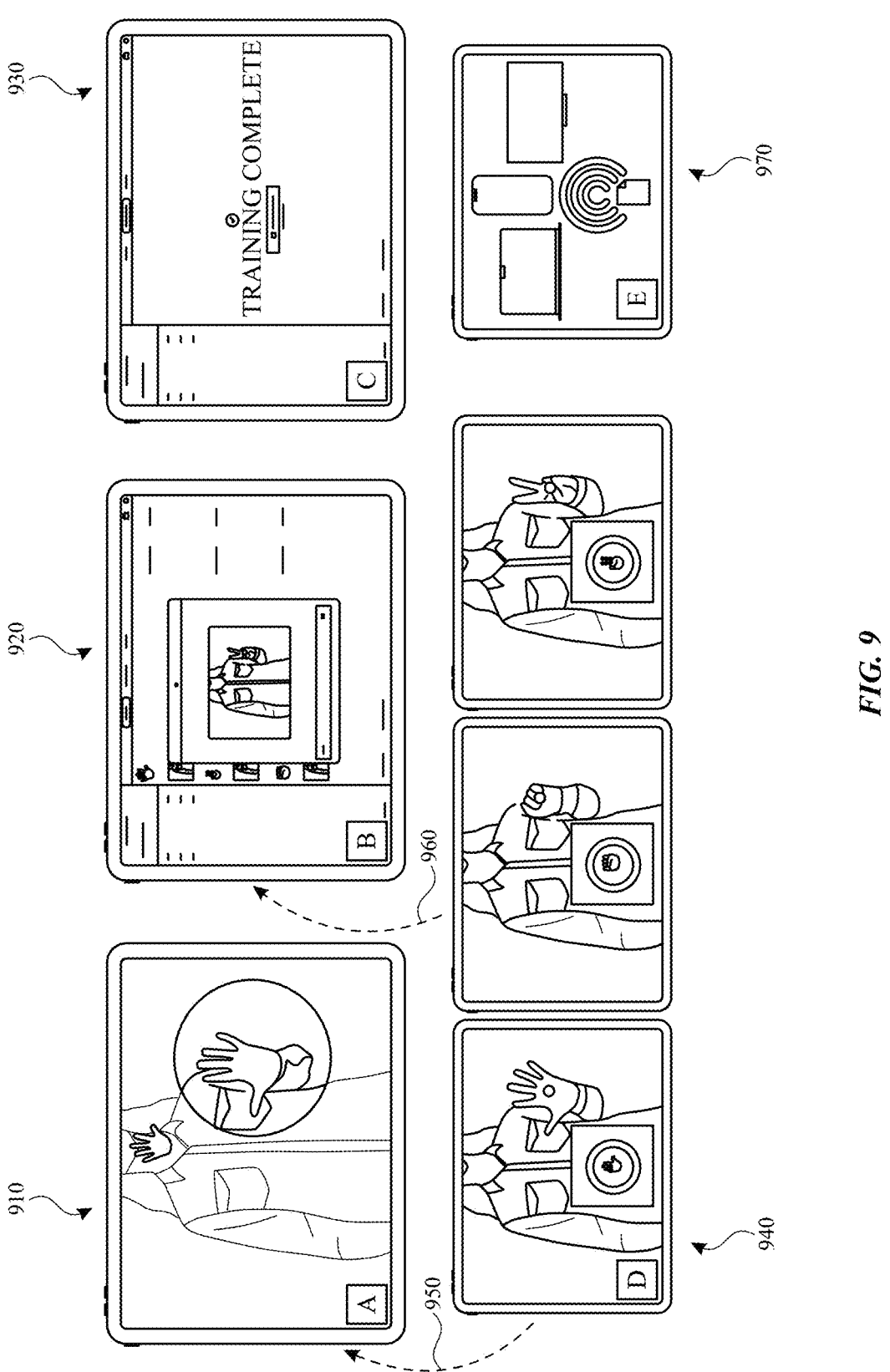
FIG. 9 conceptually illustrates a system flow diagram of an example use case for vision-based hand gesture customization in accordance with one or more implementations.

FIG. 9 conceptually illustrates a system flow diagram 900 of an example use case for vision-based hand gesture customization in accordance with one or more implementations. At step 910, for example, a registration process is initiated to obtain customized hand gestures input by one or more individual users for generating a collection of a hand gesture samples. The registration process may provide a preliminary output of training samples for each individual gesture collected. In some aspects, the registration process may serve as an interactive interface with individual users, characterized by an intent to encourage these individual users to amass a diverse array of samples. In one or more implementations, the subject technology can provide users with feedback during the registration process, alerting them to the presence of similar gestures.

In one or more implementations, the registration process may be initiated via execution of an application running on a user device (e.g., any one of the electronic device 110, 112, 114, 116, 118). In one or more other implementations, the registration process may provide a user with an option to formulate any type of gesture as a form of customization. In one or more other implementations, the registration process via the application may provide the user with an option to set a quantity of gestures to be created. For example, the registration process may allow the user to input a number of hand gestures in the a of 3 to 6 gestures. In other examples, this range may be an arbitrary number without departing from the scope of the present disclosure. In one or more implementations, the registration process may prompt or request a user to input a threshold number of hand gesture samples to amass an expanded collection. For example, the registration process may prompt a user to input a minimum of 3 hand gestures samples.

In one or more implementations, the registration process at step 910 may serve as a data collection phase with the purpose of gathering data from a predefined number of hand gestures corresponding to distinct types of gestures to facilitate the training of personalized neural network models for individual users. In one or more other implementations, the registration process at step 910 may include a sub process to perform gesture set selection based at least in part on a taxonomy of static and dynamic hand gestures to curate a set of gestures.

The taxonomy may include selection criteria that considers distinctions between hand and finger motions, in addition to gesture similarities. The taxonomy of single-handed static gestures may include, but not limited to, universally recognized gestures such as "like," "palm," "ok," "peace," "one," "rock," and "fist," among others, which exhibit distinct finger configurations. The taxonomy of two-handed static gestures may include, but not limited to, gestures such as "double thumbs up," which may mirror the single-handed static "like" gesture albeit enacted with both right and left hands. In one or more other implementations, the taxonomy of two-handed static gestures also may include "heart" and "finger frame," both of which are gestures characterized by unique hand shapes. This gesture set selection may facilitate an assessment of the pre-trained model's capacity to discern between analogous single- and two-handed gestures. In one or more implementations, the assortment of dynamic gestures prioritized those sharing akin shapes yet distinct hand movements. For example, the taxonomy of dynamic hand gestures may include, but not limited to, gestures such as "swipe left" and "swipe right," as well as "rotate clockwise" and "rotate counterclockwise," and "shake," among others. In one or more other implementations, the taxonomy of dynamic hand gestures also includes gestures such as "scissors," exclusively reliant on finger movements, alongside "pinch drag," "pinch zoom in," and "pinch zoom out," which incorporate both left-hand and right-hand movements and hand shape changes for either one or both hands. In one or more other implementations, the taxonomy of dynamic hand gestures also includes gestures such as "driving" and "rotations."

In one or more implementations, the registration process may include one or more data collection sessions for capturing both static and dynamic gestures. For example, the registration process may include an initial pair of sessions concentrated on the performance of static gestures. In a first session, for example, the registration process may prompt the individual users to input a predefined number of static gestures in sequence. In a second session, the registration process may prompt the individual users to input the same number of static gestures over an additional number of repetitions of each gesture in a random sequence. In a third session, for example, the registration process may prompt the individual users to input a predefined number of dynamic gestures in sequence. In a fourth session, the registration process may prompt the individual users to input the same number of dynamic gestures over an additional number of repetitions of each gesture in a random sequence. The ordering of the sessions described above may follow one another in temporal sequence such that static gestures precede dynamic gestures in one or more implementations, or the ordering may vary such that dynamic gestures precede static gestures in one or more other implementations.

In one or more implementations, the registration process at step 910 may include a configuration of one or more imaging sensors, such as RGB cameras, for example. For the purpose of capturing hand gestures from diverse perspectives, the registration process may activate multiple RGB cameras on respective user devices (e.g., any one of the electronic device 110, 112, 114, 116, 118). For example, the registration process may activate four RGB cameras, on separate user devices, during a session with a user, encompassing front-facing, egocentric, top-down, and side views. To facilitate coherence in timing and prevent discrepancies, the registration process may include simultaneous recording of the hand gestures by way of connecting these multiple RGB cameras on respective user devices to an external computing device running an application that facilitates the registration process.

Subsequently, at step 920, the collected samples are reviewable by users, allowing for visualization of feature extraction landmarks and the decision to either delete, retain, or add hand gesture samples to eliminate inaccurately recorded samples, thereby affirming the quality of the training data 610. For example, the application may include a sample review process that provides for display a user interface to receive user input indicating a decision relating to one or more training samples. In some aspects, the user interface may provide for display a skeleton-based feature representation of a corresponding hand gesture. In other aspects, the user interface may provide for display a prompt presenting an option to either delete, retain or add a hand gesture sample based on the display of a skeleton-based feature representation of a corresponding hand gesture. In some aspects, the skeleton-based feature representation of a corresponding hand gesture may be concurrently displayed with the decision prompt.

At step 930, on-device training of a graph transformer model is conducted using the training data 610. In one or more implementations, the training data 610 includes the collected samples, as described with reference to step 920. In some examples, the on-device training can be completed within a threshold amount of time, such as under a minute, depending on one or more factors such as on-device resources and/or size of training data 610, for example.

At step 940, users are enabled to preview and evaluate the pre-trained model's real-time performance. The user can preview and assess the real-time performance of the ML model 620. Based on the result, the user can decide to edit the gestures or samples by going back to step 910 or step 920. In one or more implementations, the preview process at step 940 may include deployment of the pre-trained model for a predefined duration of time to gather a threshold amount of feedback to update the pre-trained model. In one or more implementations, the preview process at step 940 may prompt users to provide a qualitative assessment (or feedback) of the pre-trained model by indicating whether the real-time predictions of the pre-trained model are either accurate or inaccurate. Upon the completion of deploying the pre-trained model, users may be prompted to fulfill one or more assessment questionnaires (e.g., a system usability scale (SUS) questionnaire, a task load index (NASA-TLX) questionnaire). In one or more other implementations, the preview at step 940 may include a sub process to perform gesture set selection based at least in part on a taxonomy of static and dynamic hand gestures to curate a set of gestures that remained unencountered by the pre-trained model.

At step 950, based on the obtained results of the assessments, the application may prompt users to return to step 910 and decide whether to modify the hand gestures obtained during the registration process at step 910. In one or more implementations, the application may receive user input indicating a request to replace an existing sample of a hand gesture by initiating another session to capture one or more new images of the hand gesture.

Or alternatively, at step 960, based on the obtained results of the assessments, the application may prompt users to return to step 920 and decide whether to modify the hand gesture samples in the training data 610. As discussed above, the training data 610 may include a collection of training samples that correspond to skeleton-based feature representations of hand gestures. In one or more implementations, the application may receive user input indicating a change to one or more parameters associated with a skeleton-based feature representation of a hand gesture. In one or more other implementations, the application may receive user input indicating a change to metadata associated with a skeleton-based feature representation of a hand gesture. In one or more other implementations, the application may receive user input indicating a request to delete a skeleton-based feature representation of a hand gesture. In one or more other implementations, the application may receive user input indicating a request to alter one or more landmarks of a skeleton-based feature representation of a hand gesture.

At step 970, the trained machine learning model for vision-based hand gesture customization can be synchronized across user's devices and/or exported to other electronic devices (e.g., the electronic devices 110, 112, 114, 116, 118), facilitating uninterrupted interaction. In one or more implementations, the trained model may be exported via a wireless network. In one or more other implementations, the trained model may be exported via a wired network.

Figure 10:
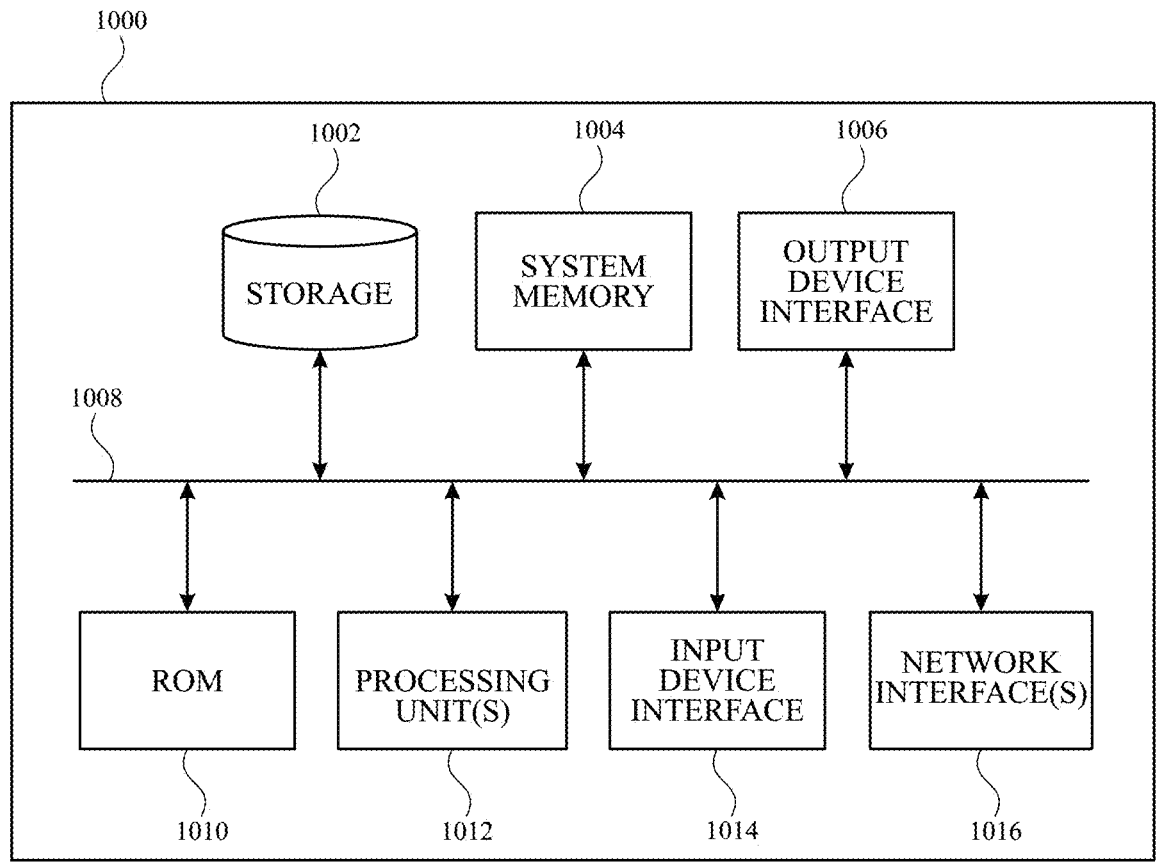
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a flash drive, and its corresponding solid state drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input device interface 1014 and output device interface 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving input data comprising image representations of a first plurality of hand gestures corresponding to different types of gestures;
for each of the first plurality of hand gestures, extracting one or more features from at least one of the image representations of the first plurality of hand gestures to produce a skeleton-based feature representation of a corresponding hand gesture of the first plurality of hand gestures;
training a neural network with a first dataset having a plurality of skeleton-based feature representations associated with the first plurality of hand gestures to produce a first trained machine learning model that is configured to predict a classification for one or more of the first plurality of hand gestures;
generating a second dataset having training samples representing at least a second hand gesture customized by a user; and
training the first trained machine learning model based at least in part on the second dataset to produce a second trained machine learning model that is configured to predict a classification for the second hand gesture customized by the user.

2. The method of claim 1, wherein producing the second trained machine learning model comprises training the first trained machine learning model with a Model-Agnostic Meta-Learning (MAML) algorithm.

3. The method of claim 1, wherein generating the second dataset comprises adjusting one or more training samples in the second dataset using meta augmentation to produce a corresponding number of gesture classes in the second dataset.

4. The method of claim 1, wherein the second dataset comprises a second plurality of hand gestures, further comprising:
selecting one or more gesture classification tasks from the second dataset, each of the one or more gesture classification tasks comprising a support set and a query set associated with the second plurality of hand gestures.

5. The method of claim 4, wherein the first trained machine learning model is trained with the support set and the query set of the one or more gesture classification tasks.

6. The method of claim 1, further comprising applying the second trained machine learning model to predict a classification for one or more hand gestures customized by the user.

7. The method of claim 1, further comprising deploying the second trained machine learning model to an electronic device to predict a classification for one or more hand gestures customized by the user.

8. A device, comprising:

a memory; and one or more processors configured to:

receive input data comprising image representations of a first plurality of hand gestures corresponding to different types of gestures;

for each of the first plurality of hand gestures, extract one or more features from at least one of the image representations of the first plurality of hand gestures to produce a skeleton-based feature representation of a corresponding hand gesture of the first plurality of hand gestures;

produce a first trained machine learning model by training a neural network with a first dataset having a plurality of skeleton-based feature representations associated with the first plurality of hand gestures to predict a classification for one or more of the first plurality of hand gestures;

generate a second dataset having training samples representing at least a second hand gesture customized by a user; and produce a second trained machine learning model by training the first trained machine learning model based at least in part on the second dataset to predict a classification for the second hand gesture customized by the user.

9. The device of claim 8, wherein the second trained machine learning model is produced by training the first trained machine learning model with a Model-Agnostic Meta-Learning (MAML) algorithm.

10. The device of claim 8, wherein the second dataset is generated by adjusting one or more training samples in the second dataset using meta augmentation to produce a corresponding number of gesture classes in the second dataset.

11. The device of claim 8, wherein the second dataset comprises a second plurality of hand gestures, wherein the one or more processors are further configured to:

select one or more gesture classification tasks from the second dataset, each of the one or more gesture classification tasks comprising a support set and a query set associated with the second plurality of hand gestures, wherein the first trained machine learning model is trained with the support set and the query set of the one or more gesture classification tasks.

12. The device of claim 8, wherein the one or more processors are further configured to apply the second trained machine learning model to predict a classification for one or more hand gestures customized by the user.

13. The device of claim 8, wherein the one or more processors are further configured to deploy the second trained machine learning model to an electronic device to predict a classification for one or more hand gestures customized by the user.

14. A non-transitory machine-readable medium comprising code that, when executed by a processor, causes the processor to perform operations comprising:

receiving input data comprising image representations of a first plurality of hand gestures corresponding to different types of gestures;

for each of the first plurality of hand gestures, extracting one or more features from at least one of the image representations of the first plurality of hand gestures to produce a skeleton-based feature representation of a corresponding hand gesture of the first plurality of hand gestures;

producing a first trained machine learning model by training a neural network with a first dataset having a plurality of skeleton-based feature representations associated with the first plurality of hand gestures to predict a classification for one or more of the first plurality of hand gestures;

generating a second dataset having training samples representing at least a second hand gesture customized by a user; and producing a second trained machine learning model by training the first trained machine learning model based at least in part on the second dataset to predict a classification for the second hand gesture customized by the user.

15. The non-transitory machine-readable medium of claim 14, wherein producing the second trained machine learning model comprises training the first trained machine learning model with a Model-Agnostic Meta-Learning (MAML) algorithm.

16. The non-transitory machine-readable medium of claim 14, wherein generating the second dataset comprises adjusting one or more training samples in the second dataset using meta augmentation to produce a corresponding number of gesture classes in the second dataset.

17. The non-transitory machine-readable medium of claim 14, wherein the second dataset comprises a second plurality of hand gestures, wherein the operations further comprise:

selecting one or more gesture classification tasks from the second dataset, each of the one or more gesture classification tasks comprising a support set and a query set associated with the second plurality of hand gestures.

18. The non-transitory machine-readable medium of claim 17, wherein the first trained machine learning model is trained with the support set and the query set of the one or more gesture classification tasks.

19. The non-transitory machine-readable medium of claim 14, wherein the operations further comprise applying the second trained machine learning model to predict a classification for one or more hand gestures customized by the user.

20. The non-transitory machine-readable medium of claim 14, wherein the operations further comprise deploying the second trained machine learning model to an electronic device to predict a classification for one or more hand gestures customized by the user.

* * * * *